US006505245B1

(12) United States Patent
North et al.

(10) Patent No.: US 6,505,245 B1
(45) Date of Patent: Jan. 7, 2003

(54) SYSTEM AND METHOD FOR MANAGING COMPUTING DEVICES WITHIN A DATA COMMUNICATIONS NETWORK FROM A REMOTELY LOCATED CONSOLE

(75) Inventors: David G. North, Plano, TX (US); John P. Engstrom, Plano, TX (US); Stephen L. De Rudder, Plano, TX (US); David L. Cathey, Plano, TX (US)

(73) Assignee: TECSys Development, Inc., Plano, TX (US)

( * ) Notice: Subject to any disclaimer, the term of this patent is extended or adjusted under 35 U.S.C. 154(b) by 0 days.

(21) Appl. No.: 09/643,786

(22) Filed: Aug. 22, 2000

Related U.S. Application Data

(60) Provisional application No. 60/197,908, filed on Apr. 13, 2000.

(51) Int. Cl.[7] ............................................. G06F 15/173
(52) U.S. Cl. ..................... 709/223; 709/224; 709/203; 709/208
(58) Field of Search ........................ 379/88.05; 707/10; 709/206–211, 217–219, 224, 223; 455/426; 714/47, 20, 31; 395/200.54

(56) References Cited

U.S. PATENT DOCUMENTS

| | | | |
|---|---|---|---|
| 5,101,424 A | | 3/1992 | Clayton et al. ................ 379/10 |
| 5,619,648 A | | 4/1997 | Canale et al. .......... 395/200.01 |
| 5,687,313 A | * | 11/1997 | Hirosawa et al. ........... 709/224 |
| 5,796,948 A | | 8/1998 | Cohen .................... 395/200.36 |
| 5,815,652 A | * | 9/1998 | Ote et al. ....................... 714/31 |
| 5,826,269 A | * | 10/1998 | Hussey ........................ 707/10 |
| 5,958,008 A | | 9/1999 | Pogrebisky et al. ........ 709/223 |
| 5,958,010 A | | 9/1999 | Agarwal et al. ............ 709/224 |
| 5,963,914 A | | 10/1999 | Skinner et al. ................ 705/11 |
| 5,964,839 A | | 10/1999 | Johnson et al. ............. 709/224 |
| 5,987,234 A | * | 11/1999 | Hirosawa et al. ...... 395/200.54 |
| 5,996,011 A | | 11/1999 | Humes ........................ 709/225 |
| 6,003,070 A | * | 12/1999 | Frantz ......................... 709/206 |
| 6,018,567 A | | 1/2000 | Dulman ........................ 379/34 |
| 6,041,347 A | | 3/2000 | Harsham et al. ............. 709/220 |
| 6,044,476 A | * | 3/2000 | Ote et al. ....................... 714/31 |
| 6,085,244 A | * | 7/2000 | Wookey ...................... 709/224 |
| 6,094,478 A | | 7/2000 | Shepherd et al. ........... 379/211 |
| 6,101,540 A | * | 8/2000 | Graf ............................ 709/224 |
| 6,138,250 A | * | 10/2000 | Nouri et al. ................... 714/31 |
| 6,173,418 B1 | * | 1/2001 | Fujino et al. .................. 714/20 |
| 6,198,920 B1 | * | 3/2001 | Doviak et al. ............... 455/426 |
| 6,199,180 B1 | * | 3/2001 | Ote et al. ....................... 714/31 |
| 6,233,317 B1 | * | 5/2001 | Homan et al. ........... 379/88.05 |
| 6,237,114 B1 | * | 5/2001 | Wookey et al. ............... 714/47 |
| 6,256,666 B1 | * | 7/2001 | Singhal ....................... 709/217 |
| 6,289,379 B1 | * | 9/2001 | Urano et al. ................. 709/223 |
| 6,301,557 B1 | * | 10/2001 | Miller et al. ................. 704/223 |

\* cited by examiner

*Primary Examiner*—Ayaz Sheikh
*Assistant Examiner*—Thu Ha Nguyen
(74) *Attorney, Agent, or Firm*—Haynes and Boone, LLP

(57) ABSTRACT

A system and method for remotely controlling a set of computing devices on a computer network is described herein. The system can include: a plurality of computing devices connected to the computer network; an user interface that allows a plurality of users to manage the computing devices; a plurality of profiles, wherein each user has at least one associated profile; means for detecting events and sending notifications for such events; and a reporting mechanism. The reporting mechanism can include a means for logging all accesses an all actions to each computing device. The means for detecting events can include classifying the events by severity, and the notification sent can include the severity. The plurality of profiles can include each computing device the associated user can access. The plurality of profiles can also include a system administrator that has total control over the system and all computing devices. The method can include: monitoring a plurality of computing devices for output; receiving output from at least one of the plurality of computing devices; logging and time stamping the received output if the output meets a predetermined criteria to be time stamped; examining output to determine whether a notification is required to be sent to a user of a plurality of users; and determining whether an action is required to be executed and if so, executing the action.

25 Claims, 24 Drawing Sheets

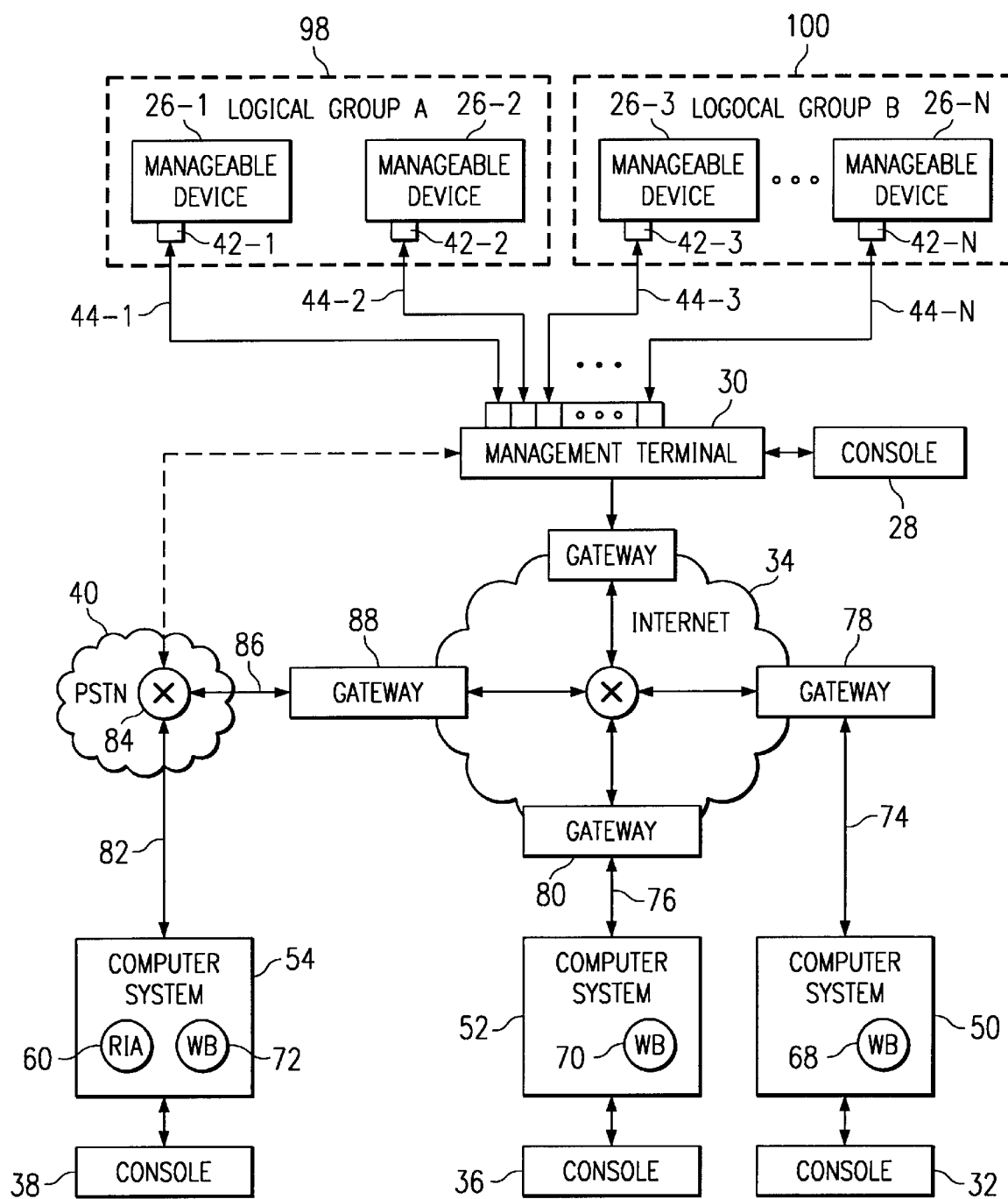

```
DELTA Jun 29 10:53:35 1999 <|... [37;4m%%%%%%%%%%% SENSYS_2 (DELTA) 29-JUN-1999 08:53:10.03 %%%%%%%
DELTA Jun 29 11:08:34 1999 <|... [37;4m%%%%%%%%%%% SENSYS_1 (DELTA) 29-JUN-1999 09:08:09.76 %%%%%%%
DELTA Jun 29 11:08:35 1999 <|... [37;4m%%%%%%%%%%% SENSYS_2 (DELTA) 29-JUN-1999 09:08:10.14 %%%%%%%
DELTA Jun 29 11:12:04 1999 <|... [37;4m%%%%%%%%%%% SENSYS_2 (DELTA) 29-JUN-1999 09:11:39.43 %%%%%%%
DELTA Jun 29 11:12:04 1999 <|... [37;4m%%%%%%%%%%% SENSYS_2 (DELTA) 29-JUN-1999 09:11:39.66 %%%%%%%
DELTA Jun 29 11:14:36 1999 *| CONSOLE MANAGER acknowledged event MSTEXIST
DELTA Jun 29 11:14:36 1999 *| CONSOLE MANAGER acknowledged event MSTEXIST
DELTA Jun 29 11:14:36 1999 *| CONSOLE MANAGER acknowledged event MSTEXIST
DELTA Jun 29 11:14:36 1999 *| CONSOLE MANAGER acknowledged event SEN_SYSTEM_MFYLM
DELTA Jun 29 11:14:36 1999 *| CONSOLE MANAGER acknowledged event SEN_SYSTEM_MFYLM
DELTA Jun 29 11:14:36 1999 *| CONSOLE MANAGER acknowledged event MSTEXIST
```

FROM FIG. 19a

| Display All | DELTA | GASPRA | GLXC0 | GLXC1 | GODOT | JEKYLL | RA7000C1 | WORMHOLE | XDELTA |
|---|---|---|---|---|---|---|---|---|---|
| Highest | | | | | | | | | |
| Latest | | | | | | | | | |

Fig. 19b

SYSTEM AND METHOD FOR MANAGING COMPUTING DEVICES WITHIN A DATA COMMUNICATIONS NETWORK FROM A REMOTELY LOCATED CONSOLE

CROSS-REFERENCE

This application claims the benefit of U.S. provisional application serial No. 60/197,908, filed Apr. 13, 2000.

FIELD OF THE INVENTION

The invention relates generally to a system for managing plural manageable devices and, more particularly, to a management system for managing computing devices within a data communications network, where the computing devices can operate on various platforms.

BACKGROUND OF THE INVENTION

A computing device is said to be manageable if it contains sufficient intelligence to both transfer data describing its operation to a user interface such as a console and to modify its operation in response to the receipt of instructions from the console or other user interface. While a computer system is one of the most widely known manageable device, it is but one of a wide array of such devices. FIG. 1a is a highly simplified block diagram of plural manageable devices. In FIG. 1a, each manageable device 10-1 through 10-N is bi-directionally coupled to a corresponding console 12-1 through 12-N. From a respective one of the consoles 12-1 through 12-N, a user, for example, a system administrator, may both monitor operation of, as well as issue instructions to, the corresponding manageable device 10-1 through 10-N. While the consoles 12-1 through 12-N may be configured to include a wide variety of interface devices, typically, each of the consoles 12-1 through 12-N include a monitor which displays operational data output corresponding to manageable device 10-1 through 10-N and a keyboard for generating instructions for transfer to the corresponding manageable device 10-1 through 10-N.

Typically, the console 12-1 through 12-N has been located in close proximity to the corresponding manageable device 10-1 through 10-N, oftentimes in the same or an adjacent room. As a result, in order to monitor the operation of the manageable devices 10-1 through 10-N, the system administrator has had to remain on-site. However, as the number of manageable devices requiring monitoring have multiplied and been geographically dispersed, on-site management of each individual device has become an unworkable solution. As a result, a wide variety of computer-implemented management systems and/or techniques which enable the management of plural manageable devices from a remotely located console have been disclosed in the art.

For example, U.S. Pat. Nos. 5,471,617 and 5,559,958 each disclose a system and method for managing a network of manageable devices from a remote located management console. A highly simplified block diagram of the management system disclosed in these patents is shown in FIG. 1b. As may now be seen, each manageable device 14-1 through 14-N is coupled to a remotely located console 16 by a network 14 which may be variously configured as a local area network (or "LAN"), a wide area network (or "WAN") or a collection of IANs and WANs commonly known as the Internet. The disclosed system has achieved the management of plural manageable devices from a single remotely located console. It does, however, have certain limitations. As further illustrated in FIG. 1b, a management agent 20-1 through 20-N resides within each of the manageable devices 14-1 through 14-N to be managed from the remotely located console 16. A management application 22 residing at the remotely located console 16 periodically polls each of the manageable devices 14-1 through 14-N for the information needed to remotely manage the device. The information for each manageable device 14-1 through 14-N is collected by the resident management agent 20-1 through 20-N and transmitted to the management application 22 residing at the remotely located console 16 using the simple network management protocol (or "SNMP") or another protocol included in the transmission control protocol/Internet protocol (or "TCP/IP") protocol suite for processing. By accessing the management application 22, the system administrator may then manage the operation of the manageable devices 14-1 through 14-N.

Unfortunately, the disclosed system has a number of shortcomings which limit its value in many real world situations. First, by requiring the installation of a management agent at each manageable device to be managed from the remote location, the cost of both constructing and maintaining the disclosed management system is increased substantially. More importantly, each of the manageable devices 14-1 through 14-N and the console 16 must all operate in a common computing environment. As a result, the manageable devices 14-1 through 14-N cannot include devices from disparate computing environments.

Thus, it should be readily appreciated that a management system which eliminates the need of installing a management agent at each manageable device to be managed by the management system would be highly desirable. It should be further appreciated that a management system which enables a system administrator to manage disparate manageable devices from a single, remotely located, console would be highly desirable as well. It is, therefore, the object of this invention to provide such a management system.

SUMMARY OF THE INVENTION

The present invention is directed to a management system for managing computing devices from a common remotely located console and without the use of management agents at each computing device thereof. In various aspects thereof, the computing devices are arranged in logical groups and managed from a corresponding invocation of a management application residing at a management terminal. A serial I/O port of each of the computing devices is coupled to an event activity module of a corresponding I/O port of the management terminal. Data output from the computing device is received by the management terminal and transferred to the invocation associated with the computing device. Within the invocation of the management application, an event detection module determines whether the received output data indicates that an event has occurred at the manageable device where the output data originated. To determine if an event has occurred, the event detection module compares the received output data to text strings maintained in a memory subsystem. If the received output data contains a text string matching one of the text strings maintained in the memory subsystem, the event detection module determines that the event corresponding to that text string has occurred. The information concerning the event is transferred to an action initiation module where actions such as issuing instructions to the computing device and generating alerts or other types of notifications to selected consoles are initiated.

In one embodiment, the invention includes an enterprise console management product developed to help Data Centers implement "LIGHTS-OUT" computing solutions by managing all or parts of an enterprise console environment. The system implements a WEB server to manage connectors which provide a cohesive, standard methodology for scanning, monitoring and reporting Data Center console events from multiple types of sources such as OpenVMS, Unix, Windows NT and Network Devices. The system communicates via SNMP, SYSLOG, UDP, LAT, SERIAL and TELNET to managed devices utilizing a WEB browser as a user interface.

The invention monitors its enterprise console connections for defined text patterns. When patterns are matched, the system automatically generates an event which may execute associated actions to notify the proper personnel, or initiate automated corrective actions based on Scripts. Notification, Actions and event generation may be governed by time of day, day of week, priority, severity or the console generating the event.

When events are detected by the system, the event must be "Acknowledged" by an authorized user. When the event is "acknowledged", the name of the user and time is logged and the user is allowed to enter what was done to correct or fix the event. The user comment for an event may be optional or required based on the event severity. The tracking of when an event occurs, when its acknowledged by whom and what they did to correct the event allows the system to provide a detailed audit report of console events and associated actions within the environment as well as how long an event was active before being acknowledged.

The system can replace older outdated products like Polycenter Console Manager or VaxCluster Console. The system imports Polycenter Console Manager and VCS Configurations directly. The system allows you to implement Enterprise Wide console/event management policies consistently and around the clock while maximizing hardware investments and gaining the most productivity from personnel.

Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIG. 2 is a block diagram of a system, constructed in accordance with the teachings of the present invention, for managing plural disparate computing devices from a remotely located console;

FIG. 8 shows an example screen after logging in;

DETAILED DESCRIPTION

Figure 1A:
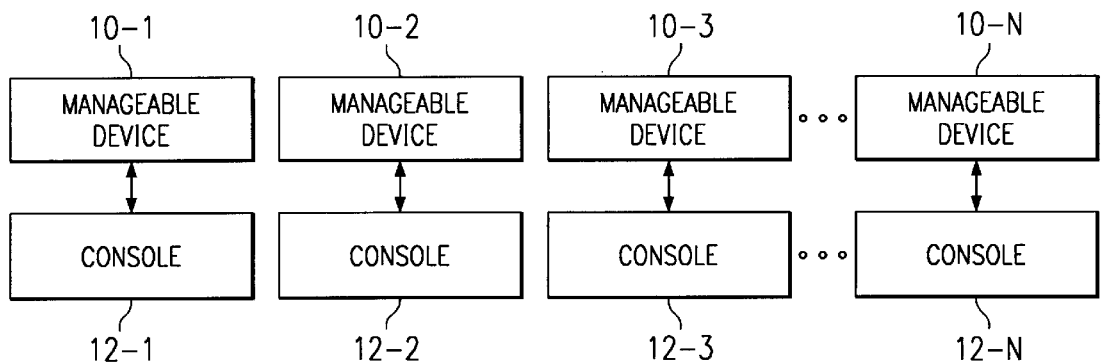
FIG. 1a is a simplified block diagram of plural computing devices and corresponding management consoles associated therewith.
Figure 1B:
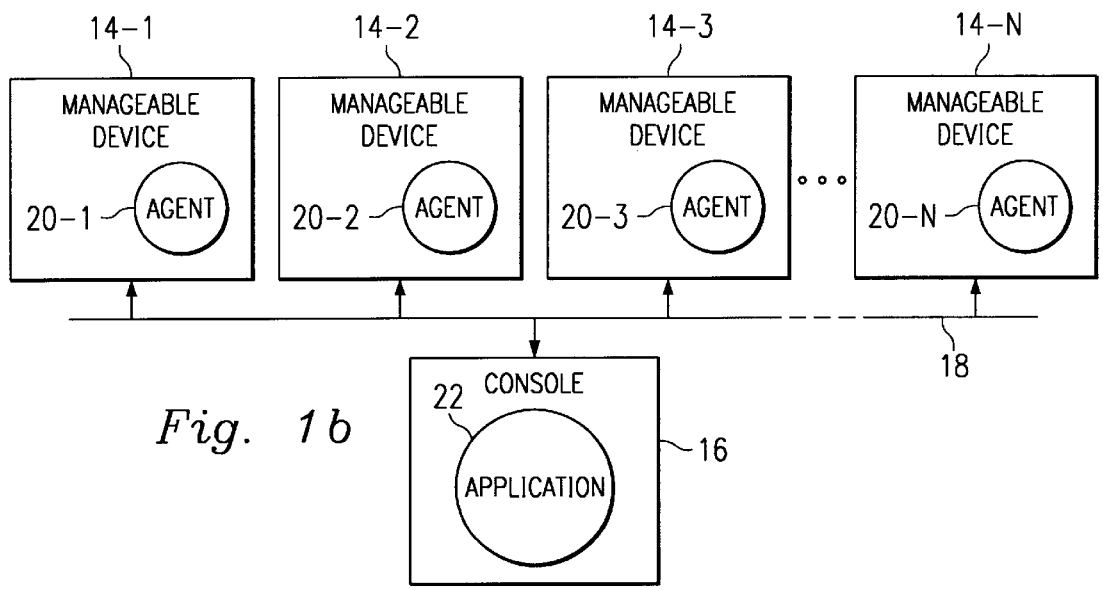
FIG. 1b is a simplified block diagram of a conventional management system for managing plural computing devices from a remotely located console.

The present invention can be described with several examples given below. It is understood, however, that the examples below are not necessarily limitations to the present invention, but are used to describe typical embodiments of operation. Moreover, a few definitions are first introduced in order to clearly describe the embodiments later in the text.

Connector Definition—A connector definition defines what is being monitored, how to connect to it, what text to look for, type of connection (LAT, TELNET, SYSLOG or SERIAL), connection definitions such as TCP/IP address, LAT Service or port address and password.

Connections—Defines the number of devices the system may manage regardless of the type of connector being used.

Event Definition—Defines the text pattern to look for from a managed console, an event class, priority, description, attributes, context and severity. The console manager may also define event context specific help text to be provided to the system user about the event. The help text may provide procedures to execute or point to a manual page via a URL, which in turn provides information about the event.

Scan Definition—Defines a group or subset of events that can be referenced and associated with a console. Scan files allow easy association of multiple events to a console by associating the scan profile to instead of individual events.

Node Definition—Defines the name of the entity being monitored, a description, connector type to use, port/address definitions, scan definitions, user security, user defmed characteristics such as system manager, support contact information and contract information. The node specific Text-box may contain any user defmed information about the device being managed. This box is intended to allow the customer to place any device specific information such as configuration, OS version and patches.

User Definition—Defines the username and password combination required to access The system. It also defines the consoles the user has access to and the type of access granted to the console based on a Profile. A user may have access to multiple profiles; each profile granting specific access to a selected sub-set of all available consoles. Each user definition provides for a free form text box containing user specific information such as the user location, manager, contact information or other information related to the user.

Action Definition—Action definitions are built on scripts that are completely user customizable. When an event occurs, The system passes all available event information to the action routine as well as event specific user define parameters such as contacts and event specific parameters. The Action routine, which is developed by the system user, may execute any set of commands including, but not limited to access to command execution on a console. Event specific timeframe definitions, originating console or severity may govern which actions are executed for each event.

Group Definition—Groups provide for a logical grouping of multiple consoles without regard to operating system, location or other physical attributes. Once in a "GROUP" a console may be reference by the group name when defining actions for an event.

Profile Definition—Profiles define arbitrary list of consoles, the types of access for the console and what types of server access a user may have which uses the profile. Users may have access to multiple profiles each governing which consoles and types of access the profile grants to a user using it. Profiles also provide a method of logically grouping an environment by location, machine type, operating system or other user business needs. A profile might be something like UNIX_ADMIN or UNIX_OPER. Where UNIX_ADMIN grants all access to the Unix machines for a user but not access to any OpenVMS or NT machines and UNIX_OPER grants only read access to the Unix consoles with no access to OpenVMS or NT consoles.

Referring now to FIG. 2, the reference numeral 24 generally designates a system for managing plural computing devices 26-1 through 26-N from a console remotely located relative to the computing devices 26-1 through 26-N. As will be more fully described below, the remote console from which the computing devices 26-1 through 26-N may be managed includes console 28 which is directly coupled to the computing devices 26-1 through 26-N via management terminal 30, console 32 which is coupled to the computing devices 26-1 through 26-N via a data network 34 such as the Internet and the management terminal 30, console 36 which, like the console 32, is coupled to the computing devices 26-1 through 26-N via the Internet 34 and the management terminal 30 or console 38 which, in alternate configurations thereof, may be coupled to the computing devices 26-1 through 26-N via the Internet 34 and the management terminal 30 or via a direct connection between a telecommunications network 40 such as the public switched telephone network (or "PSTN") and the management terminal 30.

In accordance with the teachings of the present invention, each one of the computing devices 26-1 through 26-N may be disparate from one or more of the other computing devices 26-1 through 26-N being managed by a selected one of the remotely located consoles 28, 32, 36 or 38. The term "disparate" is intended to refer to devices which operate in different computing environments. For example, the computing devices 12-1, 12-2 and 12-3 may operate on OpenVMS, Digital Unix and RedHat Linux operating systems, respectively. Of course, the foregoing association of computing devices and operating systems is purely by way of example and it is fully contemplated that these or other of the computing devices 12-1 through 12-N may operate on other operating systems other than those specifically enumerated herein. These include the Windows NT operating system which, as will be more fully described below and in the attached appendices requires selected modifications to the management operating system 24 and has certain further limitations to the management functions which may be performed from the remotely located consoles 28, 32, 36 or 38.

It should be further noted that, while in the embodiment of the invention disclosed herein, each of the computing devices 12-1 through 12-3 are disclosed to be computing systems, it should be clearly understood that one or more of the computing devices 12-1 through 12-N may be an electronic device other than a computer system so long as the selected electronic device meets certain criteria set forth below. For example, one or more of the computing devices 26-1 through 26-N may be a control pad for a security system or a temperature controller for a HVAC system so long as those particular devices meet the specified criteria.

More specifically, to be managed, by the management system 24, from a selected one of the consoles 28, 32, 36 or 38, each computing device 26-1 through 26-N must include a processor or other type of control unit (not shown), for example, a microprocessor, which controls operation of the computing device 26-1 through 26-N, a serial input/output (or "I/O") port 42-1 through 42-N and be configured such that: (1) operating information and other types of data generated by the processor are placed on an I/O line 44-1 through 44-N coupled to the corresponding serial I/O port 42-1 through 42-N; and (2) recognizable instructions placed on the I/O line 44-1 through 44-N are input the corresponding computing device 26-1 through 26-N via the serial I/O port 42-1 through 42-N.

Management, by the system administrator, of the computing devices 26-1 through 26-N is accomplished using the management terminal 30 and a selected one of the remotely located consoles 28, 32, 36 or 38. More specifically, each of the computing devices 26-1 through 26-N will generate data for output to the management terminal 30. Upon receipt of data from one of the computing devices 26-1 through 26-N, and in a manner to be more fully described below, the management terminal 30 analyzes the received data to determine if an event has occurred at the computing device 26-1 through 26-N generating the output data. Upon determining whether an event has occurred at the computing device 26-1 through 26-N, the management terminal 30 selects and executes an action. As will be more fully described below, each selected action is comprised of a series of one or more instructions and, depending on the particular action selected by the management terminal, may include issuing one or more commands to the computing device where the event has occurred, generating an alert or other type of notification by: (1) issuing a mail message containing information regarding the event to one or more selected destinations, for example, a selected one of the consoles 28, 32, 36 and/or 38; and/or (2) issuing a page to alert the system administrator, the operator of the computing device or other appropriate personnel regarding the occurrence of the event. If the management terminal 30 issues an alert or other type of notification to one of the consoles 28, 32, 36 and/or 38, the system administrator or other operator may review the information transmitted with the received alert or other notification and respond appropriately, for example, by taking corrective action, typically by issuing one or more commands to the computing device where the event occurred.

In addition to generating alerts or other types of notifications, the management terminal also performs certain logging functions, specifically, the accumulation of data in one or more data logs or files suitable for review upon request by the system administrator. In various aspects thereof, the data logs produced by the management terminal 30 may include all data output by the computing devices 26-1 through 26-N after time-stamping and sorted by computing device. The management terminal 30 also generates an audit log of each access thereto by the consoles 28, 32, 36 and 38 coupled thereto.

Figure 3:
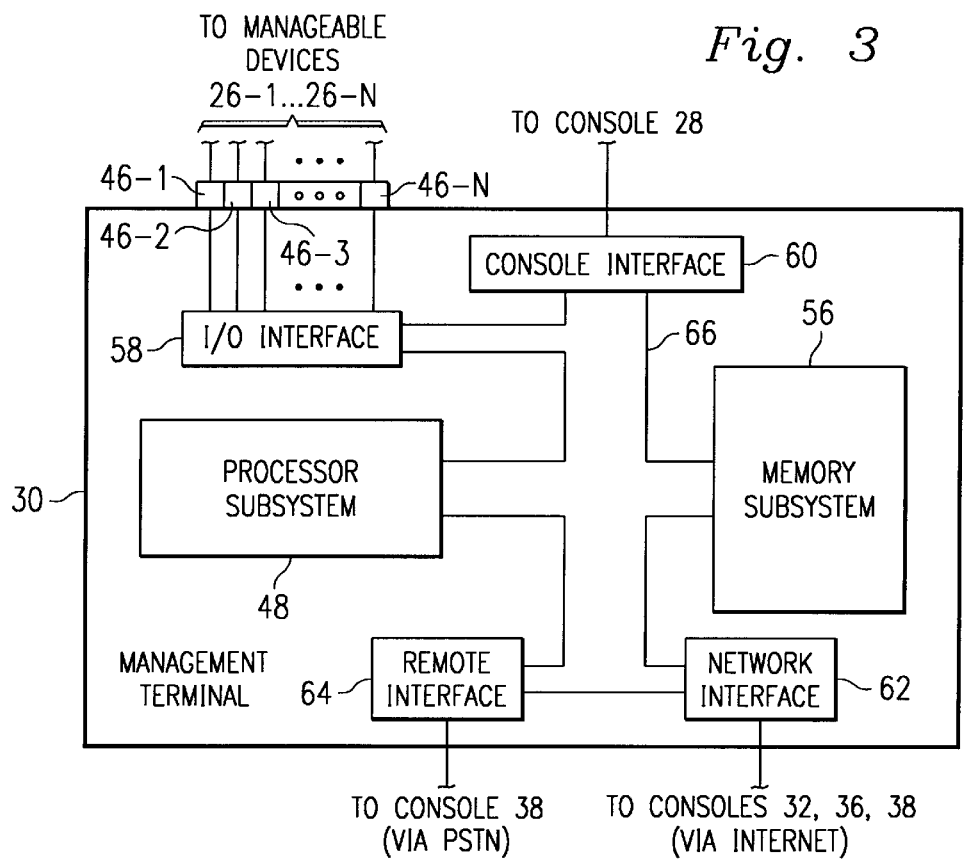
FIG. 3 is a simplified block diagram of a management terminal portion of the system for managing plural disparate computing devices from a remotely located console of FIG. 2.

Referring next to FIG. 3, the management terminal 30 will now be described in greater detail. The management terminal 30 is a computer system, preferably, a file server, having, on a backplane thereof, plural I/O ports 46-1 through 46-N to which the computing devices 26-1 through 26-N are respectively coupled. The management terminal 30 further includes a processor subsystem 48 sized to simultaneous execute plural invocations of a management application (not shown in FIG. 3) which performs event detection and action initiation functions for the management terminal 30 as well as handle accesses to the management terminal 30 by the computer systems 50, 52 and 54 via the Internet 34 and accesses by the computer system 54 via the PSTN 40.

In addition to the processor subsystem 48, the management terminal further includes a memory subsystem 56, an I/O interface 58, a console interface 60, a network interface 62 and a remote interface 64, all of which are coupled together by a bidirectional address, data and control bus 66. As previously indicated, FIG. 3 is a highly simplified illustration of the management terminal 30. Thus, by the term "processor subsystem", it is intended to refer to the collective processing capability within the management terminal 30. As such, it is fully contemplated that the processor subsystem 48 encompasses plural processing circuits variously located within the management terminal 30. Similarly, by the term "memory subsystem", it is intended to refer to the total available memory space within the management terminal 30. As such, it is fully contemplated that the memory subsystem 56 encompasses both the main, auxiliary and any cache memories within the management terminal 30. Typically, information frequently needed by the processor subsystem 48 is stored in the main memory while information less frequently needed by the processor subsystem 48 is stored in the auxiliary memory. Finally, as the main memory resides on the local bus while the auxiliary memory resides on the system bus, typically either an industry standard architecture (or "ISA") bus, an extended ISA (or "EISA") bus or a peripheral connection interface (or "PCI") bus, it should be readily apparent that the address, data and control bus 66 encompasses, the various local and system buses within the management terminal 30.

As previously set forth, when one of the computing devices 26-1 through 26-N places data on the corresponding output line 44-1 through 44-N, the data is received by the management terminal 30 via the I/O port 46-1 through 46-N coupled to the output line on which the data is received. At the management terminal 30, the incoming data is transferred to the I/O interface 58 which is responsible to its propagation to the processor subsystem 48 for processing by an event detection module (also not shown in FIG. 3) of the management application. The event detection module analyzes the incoming data to determine if, based upon the data received, an event should be generated. To do so, the event detection module compares the received data to a series of text strings stored in the memory subsystem 56. For example, if the computing device 26-1 is operated to copy data from a first storage unit to a second storage unit and to output, at the serial I/O port 42-1, each time a specified amount of data is successfully copied, the text string "[unit] data number [XYZ] successfully transferred" and the text string "critical error transferring [unit] data number [XYZ] if there was a copy error during the transfer, the text string "critical error" would be stored in the memory subsystem 56 and, upon detecting that the output data received from the computing device 26-1 contained the text string "critical error", the event detection module would determine that an event has occurred. The event detection module would then transfer selected information to an action initiation module (also not shown in FIG. 3). Using the received information, the action initiation module would determine what action should be taken and initiate the selection action, for example, generating an alert message for propagation to a selected one of the consoles 28, 32, 36, or 38.

As previously set forth, it is contemplated that the system administrator of the management terminal 30 may manage the computing devices 26-1 through 26-N from a selected one of the consoles 28, 32, 36 or 38, it is contemplated that, in addition to a video monitor for displaying information transmitted thereto by the management terminal 30, each of the consoles 28, 32, 36 and 38 further include a conventionally configured keyboard, mouse or other data input device for generating instructions for the computing devices 26-1 through 26-N for transfer to the management terminal 30. As the console 28 is directly coupled to the management terminal 30, accesses of the management application running at the management terminal 30 proceed in a conventional manner. However, in the event that the system administrator manages the computing devices 26-1 through 26-N via a console coupled to the management terminal 30 via the Internet 34, for example, the consoles 32, 36 or 38, the management application running on the management terminal 30 must be accessed using a web browser 68, 70 or 72 residing at the computer system 50, 52 or 54 corresponding to the console 32. 36 or 38 from which the management application is accessed. For example, in FIG. 2, the computer systems 50 is coupled to the Internet 34 by data line 74, for example, a T1 line, and gateway 78. Similarly, the computer system 52 is coupled to the Internet 34 by data line 76 and gateway 80. Finally, the computer system 54 is coupled to the Internet 34 via telephone line 82 to switch 84 of the PSTN 40. In turn, switch 84 is coupled to the Internet 34 via data line 86 and gateway 88.

To access the management application running on the management terminal 30 from a selected one of the consoles 32, 36 or 38 via the Internet 34, a processor subsystem (not shown) of the computer system 50, 52, or 54 executes the resident web browser 68, 70 or 72. Upon executing the resident web browser 68, 70 or 72, the processing subsystem would access the management terminal 30 by issuing commands directed to an Internet protocol (or "IP") address of the management terminal 30. In response, the management terminal 30 would transfer data to the computer system 50, 52, or 54, for example, in the form of a graphical user interface (or "GUI"), which would enable the system administrator to view data residing at or issue instructions to the management terminal 30 from the console 32, 36 or 38 as if the system administrator had accessed the management terminal 30 from the console 28.

Finally, the system administrator may also remotely access the management terminal 30 using a direct link from the computer system 54 to the management terminal 30 via the telephone line 82, the switch 84 of the PSTN 40 and a telephone line coupling the switch 84 to the management terminal 40. By executing the remote interface application 90, the console 38 emulates the console 28. As a result, the system administrator may manage the computing devices 26-1 through 26-N from the console 38 in the same manner as from the console 28.

Figure 4:
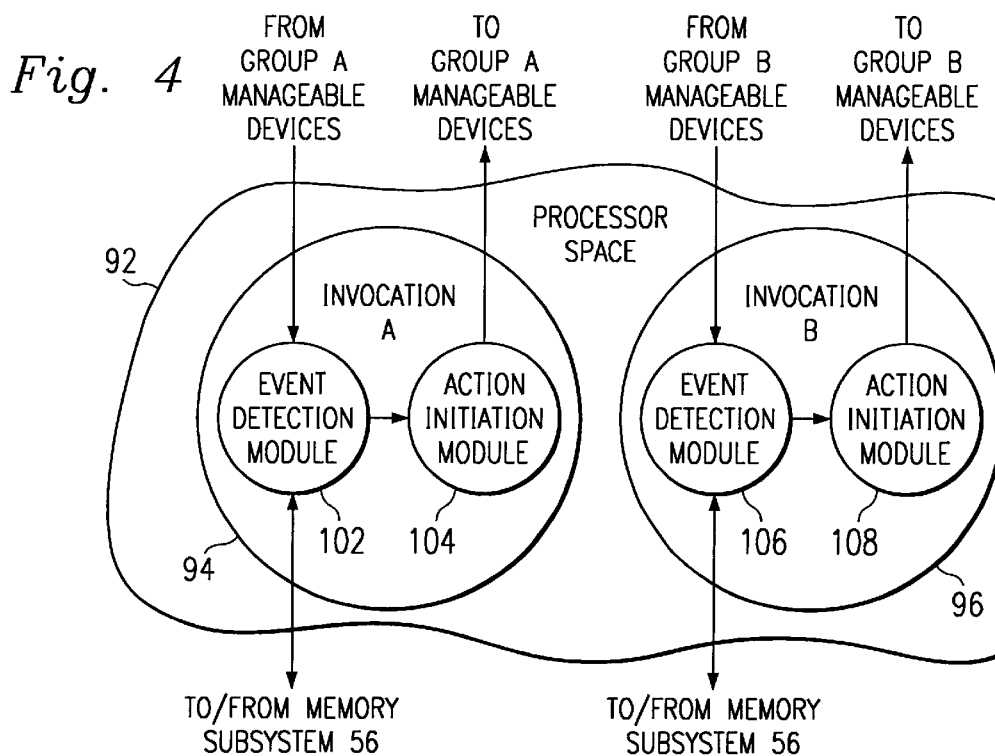
FIG. 4 is a block diagram of processor space, located within a processor subsystem of the management terminal of FIG. 3, where plural invocations of a management application for managing plural disparate manageable reside.

Referring next to FIG. 4, the aforementioned management application which resides on the management terminal 30 will now be described in greater detail. Within the management terminal 30, the management application is stored within the memory subsystem 56 and is executable by the processor subsystem 48. As will be more fully described below, the processor subsystem 48 may execute plural invocations of the management application. For example, in FIG. 4, first and second invocations 94 and 96 of the management application have been executed by the processor subsystem 48 and are resident within the processor space 92. As will be more fully described below, in one aspect of the invention, the computing devices 26-1 through 26-N are divided into logical groups, each of which are to be managed by a respective invocation of the management application. For example, in FIG. 2, the computing devices 26-1 and 26-2 form a first logical group 98 while the computing devices 26-3 through 26-N form a second logical group 100. The logical group 98 (also referred to as logical group "A") is managed by the first invocation 94 (also referred to as invocation "A") while the logical group 100 (also referred to as logical group "B") is managed by the second invocation 96 (also referred to as invocation "B") of the management application.

Each invocation 94, 96 of the management application is comprised of first and second modules 102 and 104, 106 and 108, each of which is comprised of a series of lines of code containing a combination of executable instructions and text comments. More specifically, each invocation 94, 96 of the management application includes an event detection module 102, 106 and an action initiation module 104, 108. Of course, each invocation 94, 96 may instead be configured with a single module which combines the code of the event detection module 102, 106 and the action initiation module 104, 108. As will be more fully described below, the invocations 94 and 96 operate identically except in that they receive serial data output from groups A and B, respectively, of the computing devices 26-1 through 26-N and they issue instructions to groups A and B, respectively, of the computing devices 26-1 through 26-N. Accordingly, it is contemplated that only a description of the operation of the invocation 94 is necessary for a complete understanding of the techniques by which the invocations 94, 96 manage respective groups of the computing devices 26-1 through 26-N.

More specifically, the event detection module 102 of the invocation 94 of the management application receives serial data output the computing devices 26-1 and 26-2. In addition to a logging operation to the memory subsystem 56 more fully described below, the event detection module 102 analyzes the received data output one of the computing devices 26-1 or 26-2 to determine if, based upon the data received, an event should be generated. To do so, the event detection module 102 compares the received data to a series of text strings stored in the memory subsystem 56. Upon detecting that the output data received from the computing device 26-1 or 26-2 contains a text string matching a text string stored in the memory subsystem 56, the event detection module 102 would determine that an event has occurred. The event detection module 102 would then transfer selected information to the action initiation module 104. Using the received information, the action initiation module 104 would determine what action should be taken and initiate the selection action, for example, issuing an instruction to the computing device 26-1 or 26-2 which output the serial data, the analysis of which indicated that an event had occurred. The action initiation module 104 may also initiate generation of an alert message for propagation to a selected one of the consoles 28, 32, 36, or 38.

Figure 5:
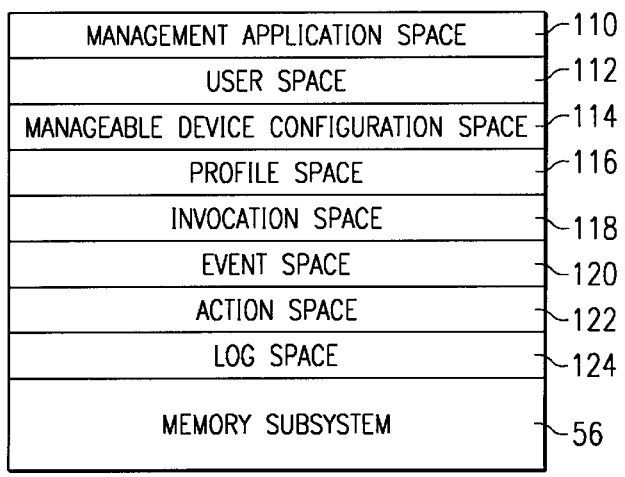
FIG. 5 is a block diagram of memory space, located within a memory subsystem of the management terminal of FIG. 3.

Referring next to FIG. 5, the memory subsystem 56 will now be described in greater detail. As may now be seen, the memory subsystem 56 is subdivided into a management application space 110, a user space 112, a computing device configuration space 114, a profile space 116, an invocation space 118, an event space 120, an action space 123 and a log space 124. The management application space 110 contains the management application which may be repeatedly launched, by the processor subsystem 56, as a discrete invocation. Each time the management application is launched by the processor subsystem 56, the processor subsystem 56 identifies which ones of the computing devices 26-1 through 26-N are placed in the logical group to be managed by the invocation being launched by accessing information contained in the profile space 116.

The user space 112 is comprised of a series of entries, each of which describes a person authorized to access the management terminal 30 to manage and/or monitor operation of selected ones of the computing devices 26-1 through 26-N. Each entry in the user space contains first, second and third fields. The first field contains a user name for an authorized user, the second field contains a password for the authorized user and the third field identifies the profiles maintained in the profile space 116 to which the user has access.

The computing device configuration space 114 comprised of a plurality of sub-spaces, each of which contains a definition of one of the computing devices 26-1 through 26-N. For each one of the computing devices 26-1 through 26-N, the computing device configuration space 114 includes a corresponding sub-space which includes a name field which defines the name of the computing device, a description field which contains an arbitrary description of the computing device, a log field which defines whether data received from the computing device is time-stamped and logged in the log space 124, a type field which defines the type of connection for the computing device, a port/service field which identifies the I/O port used to output data to the management terminal, a status field which describes the connection status of the computing device, a text box which contains textual information regarding the computing device, a profile access field which identifies which profiles maintained in the profile space 116 have access to the computing device and a protect/strip field which lists protected characters which are protected from being sent to the computing device except by selected users and strip characters which are never sent to the computing device under any circumstances.

The profile space 116 contains a series of profiles, each of which describes a set comprised of selected ones of the computing devices 26-1 through 26-N and access rights to each computing device of that set. Generally, profiles are used to limit which of the computing devices 26-1 through 26-N and types of access for a user defmed in the user space 112. Once profiles are constructed, they are granted to users. The user then inherits the access to the computing devices 26-1 through 26-N granted to the profile. A single user may be granted access to multiple profiles, but only one of those profiles may be used at a given time. Profiles provide access to the computing devices 26-1 through 26-N for read, write and control operations. Read operations enable a user to monitor the output of a computing device. Write operations enable a user to transmit instructions to the computing device and control operations enable a user to transmit protected characters to the computing device.

The invocation space 118 contains an invocation configuration file which is used by the processor subsystem 48 which executing the corresponding invocation of the management application. The invocation configuration file for an invocation identifies which of the ports that the corresponding invocation should listen to.

The event space 120 is comprised of a series of entries, each of which describes an event which may be detected by the event detection module 102. Each entry contains a text string, which when matched to output data received from one of the computing devices 26-1 through 26-N, causes the event detection module 102 to determine the occurrence of the event. The event contained in each entry contains several characteristics which include name, description, pattern, priority, severity, display lines, help text box and member of scans. The name defines an arbitrarily assigned name for the event. The description provides a brief definition of what the event is and what it means. The pattern defines the text pattern which the event detection module 102 shall monitor the output data received thereby to determine if it contains the defmed text pattern. The priority defines the user priority of the event. The severity defines the severity of the event. The display lines enable the user to define the context of an event by enabling the user to review the display lines above and below the text pattern causing the detection of the event. The help text box provides the user with instructions on what to do with the event when it occurs. In alternate embodiments thereof, the help text box may contain text, a pointer to internal documentation on the event, a link to an external web page providing information on the event or even a list of manual procedures to execute to correct the event. The member of scans allow the event to be added to multiple scan files.

The action space 122 maintains actions to be associated with each of the events maintained in the event space 120 such that when an event occurs at one of the computing device 26-1 through 26-N and is detected by the event detection module 102, the action initiation module 104 will automatically execute the associated action. To construct an action, a command procedure comprised of a series of instructions is created. The definition of the event to be associated with the constructed action is modified to identify the name of the constructed action to be executed upon detection of the associated event. It is contemplated that a wide variety of actions may be constructed by the system administrator for the management system 24. Among the actions which may be constructed are mail action, OPCOM action, page action and send action.

The mail action sends a mail message containing information about the event that the mail action is associated with to selected ones of the consoles 28, 32, 36 or 38. The OPCOM action sends a message containing information about the event that the OPCOM action is associated with to specified operators of the computing device where the event occurred. The page action generates the list of parameters needed to send mail to a pager or cell-phone. Finally, the send action enables the action initiation module to issue commands to the computing device where the event associated with the send action occurred.

Finally, the log space 124 contains plural directories, one for each invocation of the management application. In turn, each directory contains a series of data files, one for each of the computing device logically grouped with that invocation. For example, in the embodiment of the invention illustrated in FIGS. 2–5, the log space 124 would be comprised of a first directory corresponding to the invocation 102 and a second directory corresponding to the invocation 104. The first directory would be comprised of first and second data files, one corresponding to the computing device 26-1 and the other corresponding to the computing device 26-2. Similarly, the second directory would be comprised of N-2 data files, one corresponding to each of the computing devices 26-3 through 26-N. Each data file contains the data output by the corresponding computing device to the event detection module 102. There, the received output data is time stamped and transferred to the corresponding data file for storage. The data file for each one of the computing devices 26-1 through 26-N are named using the format "DEVICE.LOG_YYYY_MM_DD". The log space 122 also includes an audit log of each access to the management terminal 30, including the user accessing the management terminal 30, and the actions taken by the user while accessing the management terminal 30.

Figure 6:
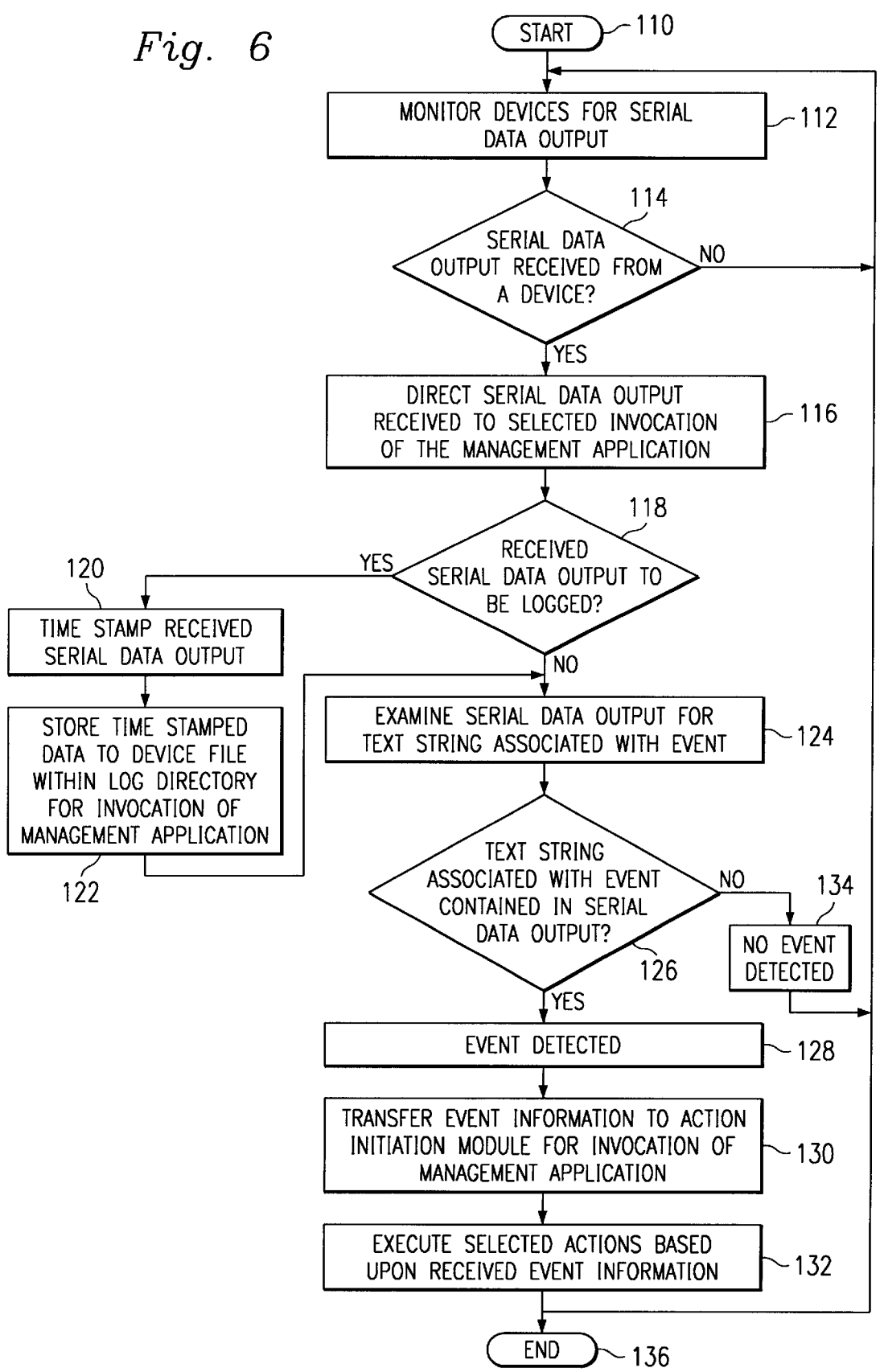
FIG. 6 is a flow chart of a method of managing disparate computing devices from a selected console of the management system of FIGS. 1–4.

Referring next to FIG. 6 a method of managing one or more disparate computing devices in accordance with the teachings of the present invention will now be described in greater detail. It should be noted that, in the embodiment of the invention described with respect to FIG. 6, the computing devices 26-1 through 26-N being managed using the managing terminal 30 are limited to passively computing devices which output data, via the respective serial port 42-1 through 42-N or other direct connector to the managing server 14, without necessitating the managing terminal 30 to poll or otherwise interrogate the computing device 26-1 through 26-N. The management of plural computing devices which include one or more actively computing devices for example, those devices using the Windows NT operating system, are described in greater detail in the attached appendices.

The method commences at step 110 by initiating execution, by the processor subsystem 56 of the managing terminal 30, of the management application residing thereat. For example, the management application may execute upon boot of the managing terminal 30 or upon receipt of a command issued to the managing terminal by the console 28. Generally, execution of the management application may not be initiated from any of the consoles 32, 26 or 38 tied to the managing terminal 30 via the Internet 34. However, execution of the management application may be initiated from the console 38 when accessing the managing terminal 30 via the PSTN 40 using the remote interface application 90 which enables the console 38 to emulate the console 28.

In various embodiments of the invention, execution of the management application may involve the execution of plural invocations of the management application. As previous set forth, it is specifically contemplated that each of the plural computing devices 26-1 through 26-N is assigned to a selected invocation of the management application. Each invocation of the management application is a separate copy thereof, differing only on which group of computing devices 26-1 through 26-N are managed by that invocation of the management application.

Proceeding on to step 112, the event detection module 102 of the management application begins the management process by monitoring the computing devices 26-1 through 26-N for serial data output. To do so, the management application monitors I/O ports 42-1 through 42-N for the serial data output one of the computing devices 26-1 through 26-N. Monitoring continues until, at step 114, the event detection module 102 detects the receipt of incoming data. The event detection module 102 checks the I/O port at which the incoming data was received and, if the incoming data arrived at one of the I/O ports 46-1 through 46-N which are respectively coupled to a corresponding one of the computing devices 26-1 through 26-N, the method proceeds to step 116, below. If, however, the incoming data arrived from at any other I/O port other than the ones coupled to the computing devices 26-1 through 26-N, or if no incoming data has been received by the managing terminal 30, the method returns to step 112 where the event detection module 102 continues to monitor for the arrival of serial data output the computing devices 26-1 through 26-N.

At step 116, the serial data output received from one of the computing devices 26-1 through 26-N is directed to the invocation of the management application which is detecting events for the logical group which includes the computing device from which the received serial data output originated.

Continuing on to step 118, upon receipt of the serial output data by the event detection module of the invocation of the management application managing that device, the event detection module 102 determines if the computing device where the data originated is to be logged in the log space. To do so, the event detection module checks the log field of the device description maintained in the device space. If the log field indicates that data received from the computing device is to be logged, the method proceeds to step 120 where the received serial data is time stamped, for example, by appending a header containing the year, month, day and time at which the serial data was received. Continuing on to step 122, the time stamped data is logged for later review, preferably, by storing the time stamped data in the appropriate data file within the log space 124.

After writing a copy of the received serial data having a time stamp appended thereto to the appropriate data file within the log space 124, or if it is determined at step 118 that the received serial data is not to be logged, the method proceeds to step 124 where the received serial data output is examined to determine if it contains a text string associated with an event. To do so, the event detection module 102 compares the received serial data to each of the text strings maintained in the event space 120 of the memory subsystem 56. If the received serial data contains a text string which matches one of the text strings maintained in the event space 120 of the memory subsystem 56, the event detection module 102 determines at step 128 that the event associated with the matching text string has been detected. The method then proceeds on to step 130 where the event detection module transfers event information related to the detected event to the action initiation module 104 and at step 132, the action initiation module 104 initiates the actions associated with the detected event.

Upon execution the actions associated with the detected event at step 132 or upon determining, at step 134, that no event has been detected, the method returns to step 112 for continuing monitoring of the computing devices 26-1 through 26-N. The method continues until the management application is closed at step 136 to end the method.

Now turning to a specific embodiment, the system utilizes a customized WEBserver to collect and manage the user and console interface for all managed devices. The system allows the console manager to define the type of connection for the system, what type of events or text patterns to scan for and what actions to take when an event is detected.

Specific timeframes can be defined when an action may be executed based on day of week and time of day. The system provides a graphical interface to timeframe definitions. For example, timeframes may allow execution of an action for Monday, Wednesday, and Friday between the hours of 8:00 am and 5:00 pm with the exception of 11:00 am and 12:35 pm.

Additionally, the system installation is accomplished via a standard VMSINSTAL installation procedure on the system server. The user interface or Browser is installed using standard Browser/Operating System installation procedures. The system supports industry standard Internet browsers such as, but not limited to, Netscape and Microsoft Internet Explorer. Browsers are required to be Java-Script capable and have Java-Script enabled.

The system also provides a centralized single point of operations, which may be, managed anywhere in a network. All console connections are concentrated in a single intelligent console-monitoring environment where real-time detection and notification of console events may take place.

The system primary user interface is via industry-standard WEB browsers like, but not limited to, Microsoft Internet Explorer and Netscape Communicator. By utilizing a WEB-based interface, access to monitored consoles may be gained throughout a network. Also having a well known user-friendly interface minimizes user training.

The system allows multiple personnel to access the same monitored console or multiple consoles at the same time. Where multiple people are connected to the same console some may be connected in read/write and others may be connected for read-only access.

The system also timestamps and logs all console activity in a console log file. The console log file may be reviewed, searched, or mailed when necessary. Every message coming from a console and each time someone executes a command on a monitored console, all activity is logged in the console log file for later review.

The system also limits what each user may accomplish on each console by utilization of console privileges based on a console and user combination. This capability allows for multi-tiered operations and system level access based on skill level or access security.

This embodiment scans each character received from a monitored console based on event definitions, which define a pattern of characters to look for. When the text pattern is matched a console event is generated by the system for the monitored Console. In turn, the event can cause a single or multiple user-defmed actions to occur which can notify a user of the event or execute scripts, which may interact with the console generating the event.

When events are detected, Scripts may be executed immediately or every nth time they occur. Scripts may also be scheduled for execution based on time of day, day of week or by event context such as when it originated, priority, classification or contact information.

This embodiment of the system is deployed in the Enterprise. As a result, it utilizes enterprise connectivity "Connectors" for connecting to and monitoring consoles and information in the enterprise. Connectors include LAT, SERIAL, TELNET, SYSLOG, and UDP. By using one or more of these types of connectors, the system user may manage NT, OpenVMS, Unix Systems and Network equipment such as Routers, Bridges and Hubs.

The system also provides the capability for its users to create event specific information, which may be referenced as help, operational directions, restart/shutdown instructions or other event related information which may be relevant when an event is detected.

The system provides several classifications such as "Critical", "Informational", "Warning" and others. The system users may extend the list of event classifications to include user-defmed classifications like: application, operational, system, database etc.

The system also allows the user to associate any text information with a console which may include things like: Contract Support Number, Purchase P.O., Serial Number, Field Service Number and Contact, Network Information or Operating System patches installed. Each node's console context may be different from the other.

This embodiment is the perfect replacement from older console management products like VaxCluster Console Monitor and Polycenter Console Manager. The system imports node, scan, event and user information directly from those systems into the system configuration. As a result, the system customer gets a plug-and-play implementation with minimal work.

When the system detects an event, actions may be executed to initiate a solution for the event. Actions may be governed by console name or timeframe describing which action to execute based on when the event occurred.

The system reports provide daily, hourly or detailed summaries on events that occurred while The system was running. Event reports allow the system manager to understand where and when the majority of events occur and what has been done as a result by whom.

This embodiment includes a customized WEB server. The system WEB server currently runs on the following operating system/hardware platforms:

| | |
|---|---|
| OpenVMS 7.1(VAX or Alpha) | True64 Unix 4.0D |
| Solaris 7.0 | REDhat Linux 6.0 (Intel, Alpha) |
| Windows NT Server SP3 4.0 (Intel) | |

Because the system is a WEB based tool, the user interface is based on a Web browser that is Java and Java Script enabled. This allows almost any desktop or workstation to be used to access The system providing the greatest flexibility and capability for the user and the product. Listed below are a few implementations for this embodiment:

| | |
|---|---|
| Windows 95 Microsoft Internet Explorer 4.0 or greater | Windows 98 Microsoft Internet Expl 4.0 or greater |
| Windows NT 4.0 Microsoft Internet Explorer or Netscape | OpenVMS 7.1/Netscape |
| Solaris/Netscape | Apple Mac 8.0/Netscape |
| True64 Unix/Netscape | Redhat Linux/Netscape |

Others may also work if they support Java and javascript. The system also supports a dumb terminal interface native to the server it is running on to allow dialup VT100 style access to managed devices.

A few actual screens will now be described in FIGS. 7–25.

Figure 7:
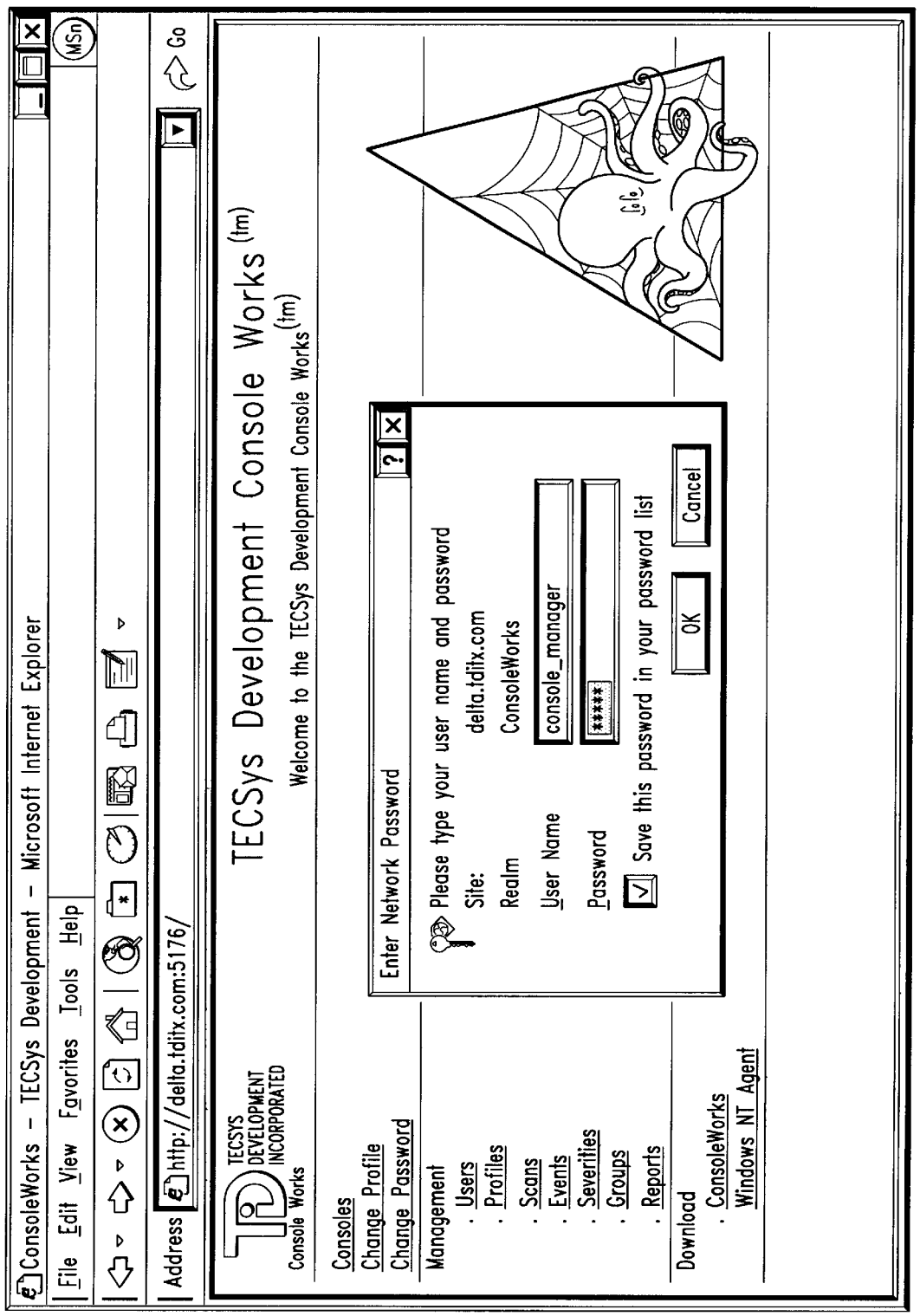
FIG. 7 shows an example of a login screen.

FIG. 7 shows an example of a login screen for a console_ manager user.

Figure 8:
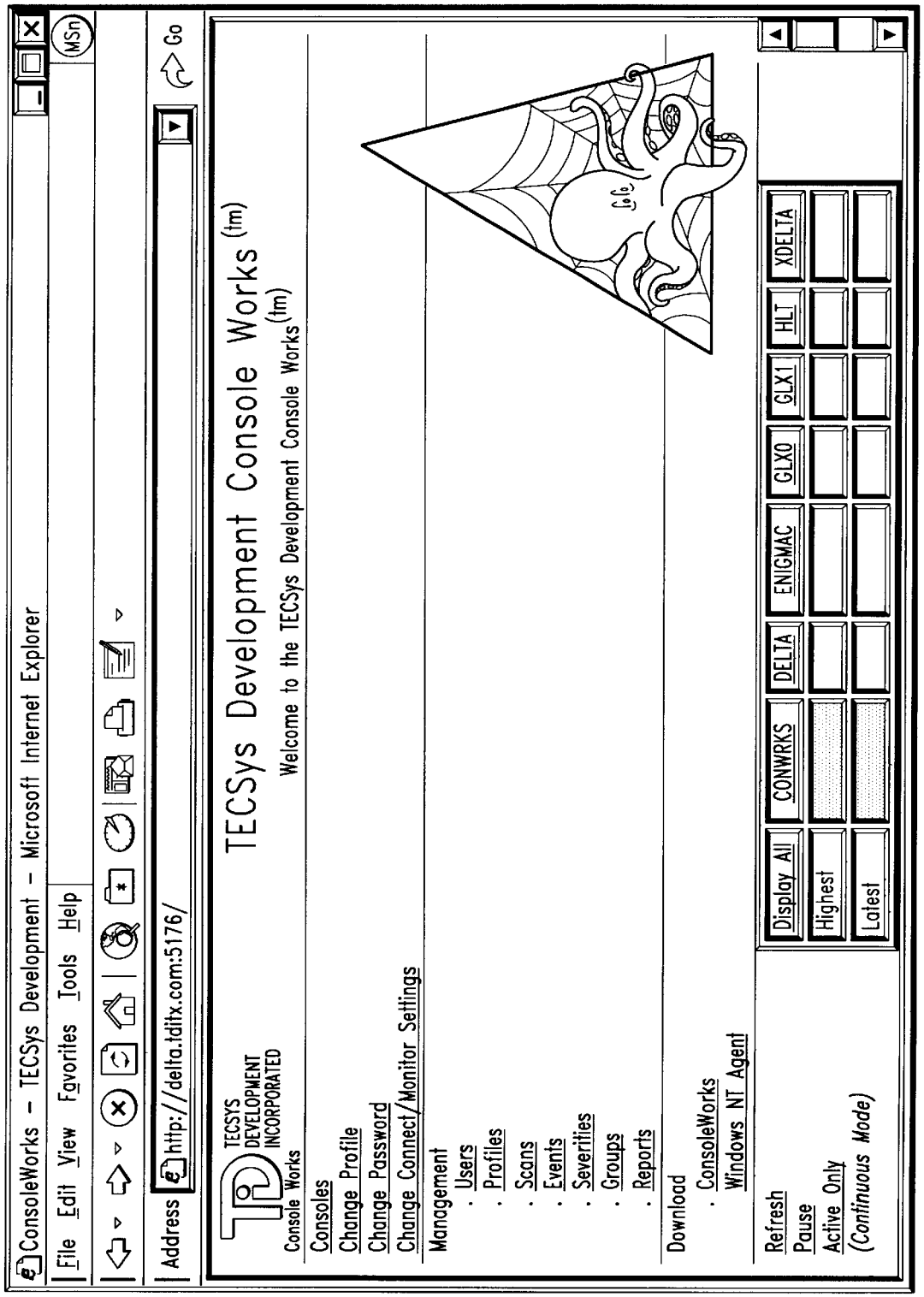

FIG. 8 shows an example screen that the console_ manager user would see after logging in.

Figure 9:
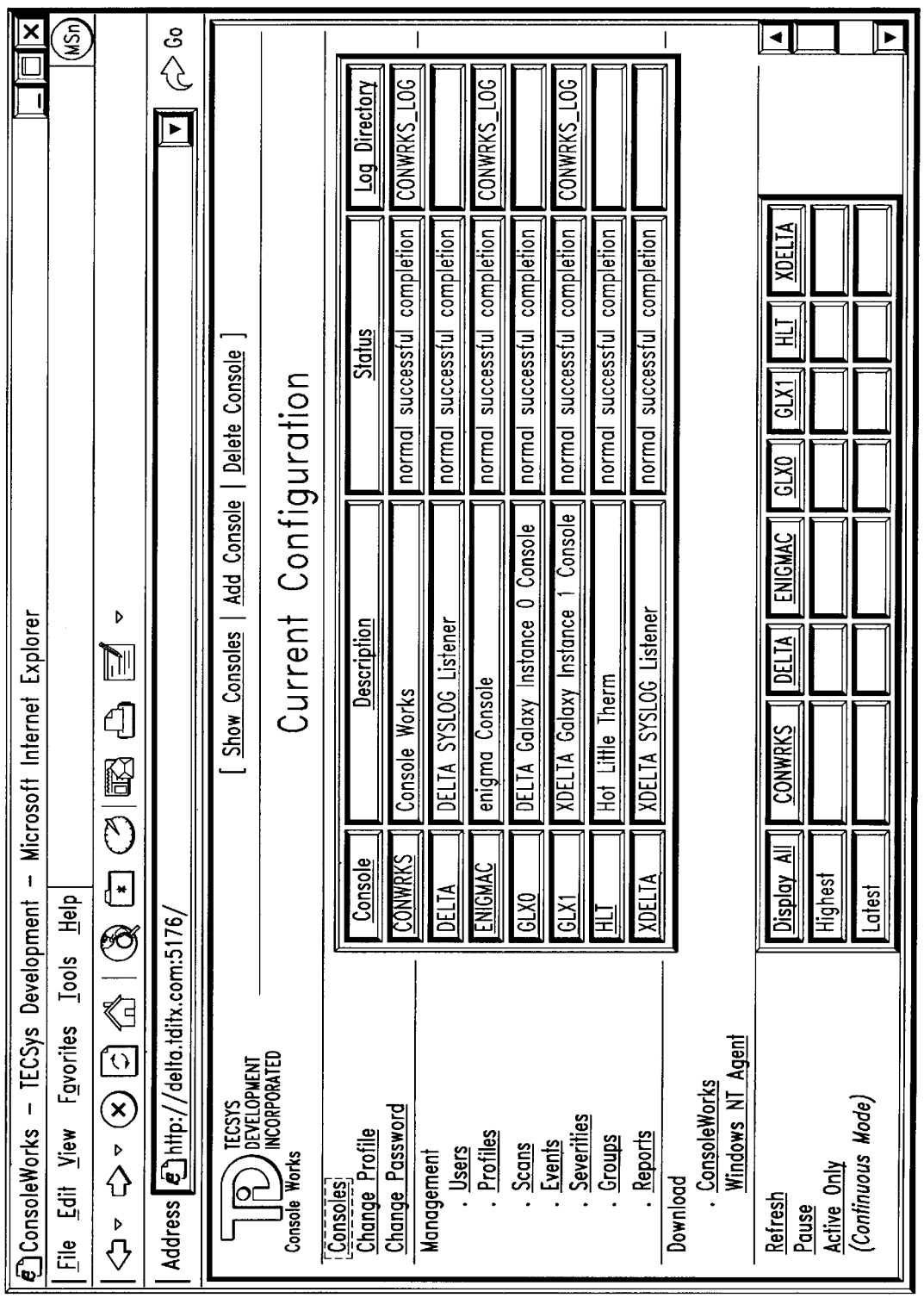
FIG. 9 shows an example screen for current configuration of the consoles.

FIG. 9 shows an example screen that the console_ manager user would see for the current configuration of the consoles the user has access to.

Figure 10:
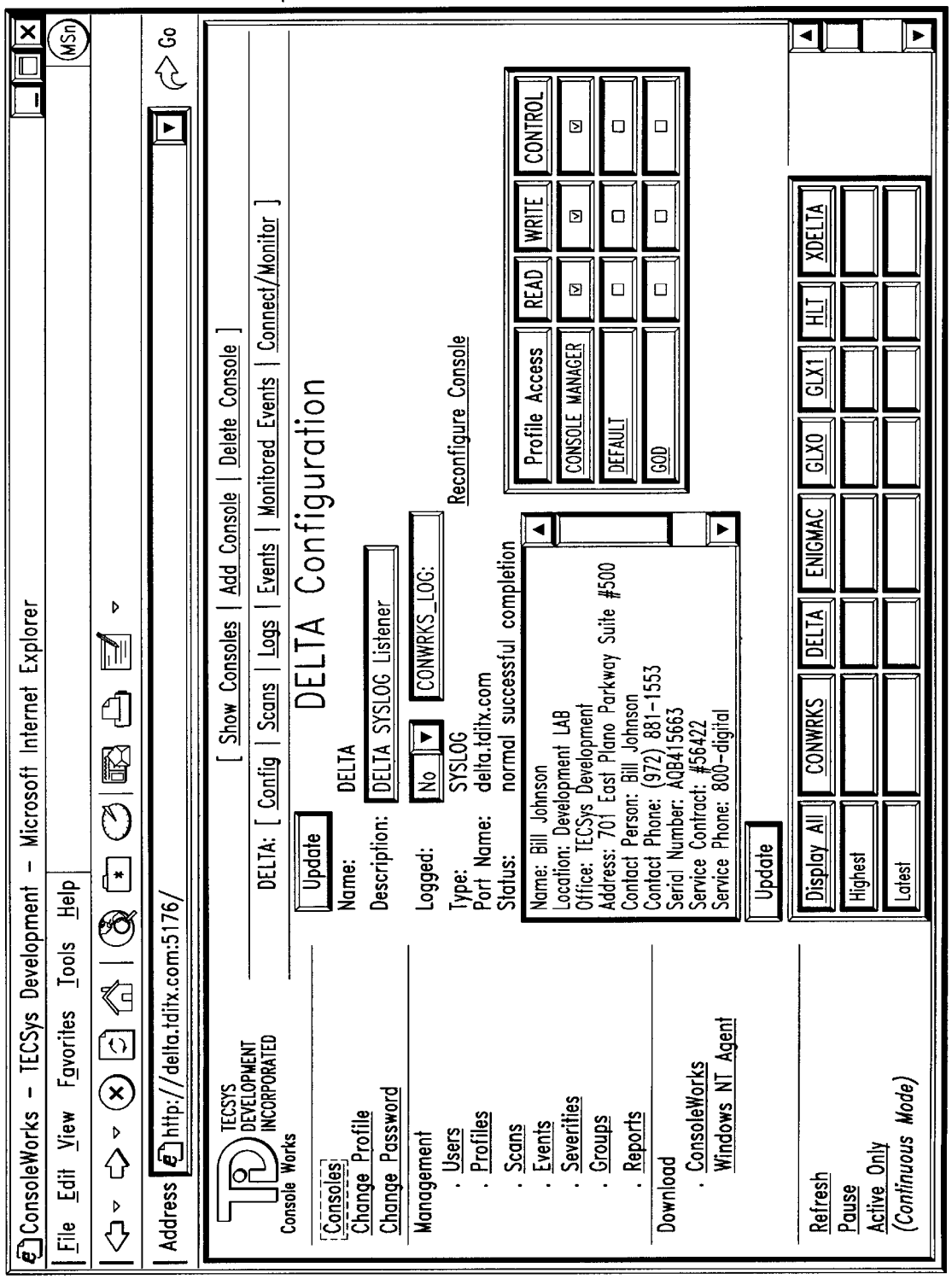
FIG. 10 shows an example screen after selecting the DELTA computing device.

FIG. 10 shows an example screen that the console_ manager would see after selecting the DELTA computing device.

Figure 11:
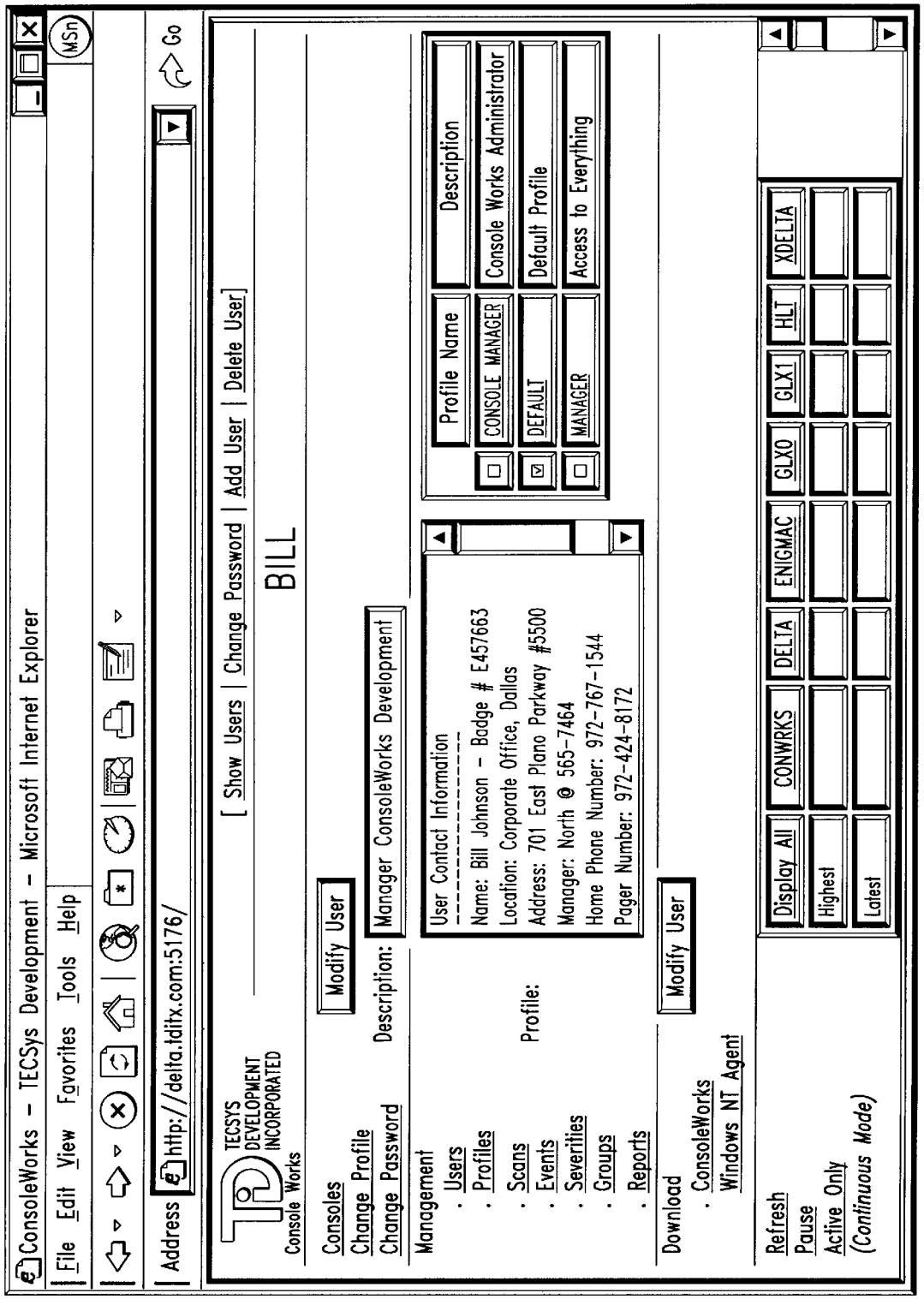
FIG. 11 shows an example screen for modifying an user.

FIG. 11 shows an example screen that the console_ manager would see for modifying the user Bill Johnson.

Figure 12:
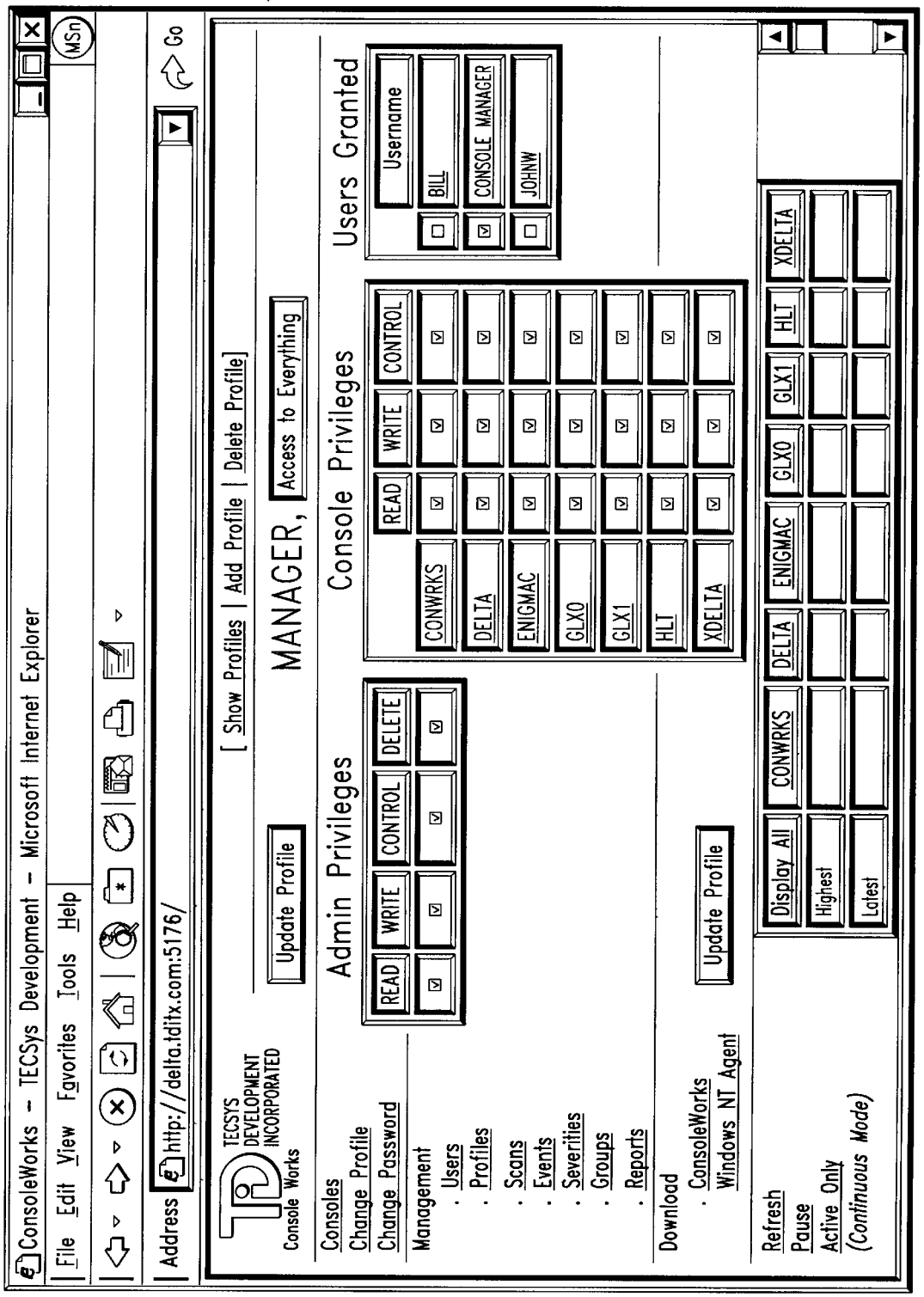
FIG. 12 shows an example screen for modifying the Manager profile.

FIG. 12 shows an example screen for modifying the Manager profile.

Figure 13A:
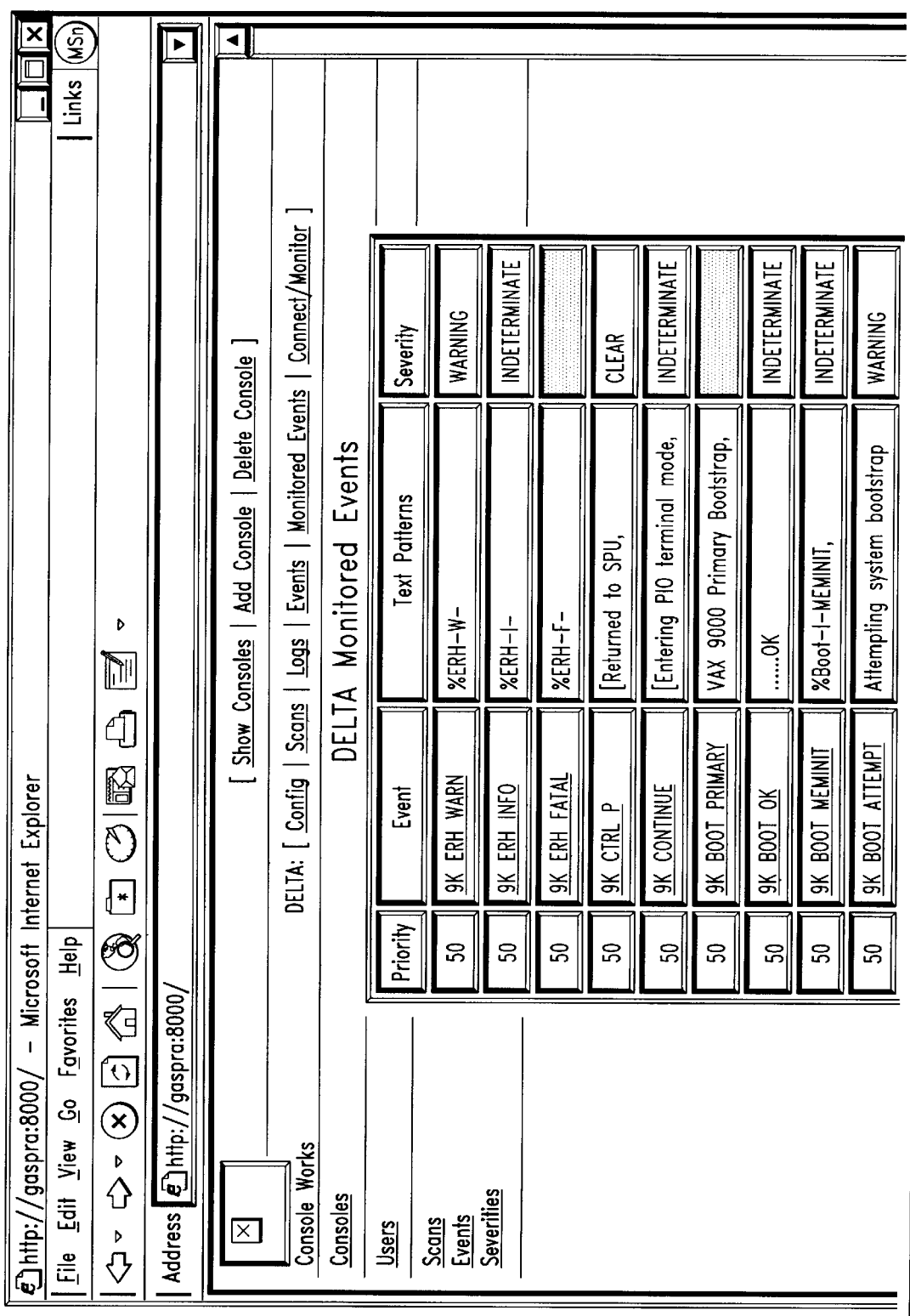
FIG. 13 shows an example screen of monitored events.
Figure 13B:
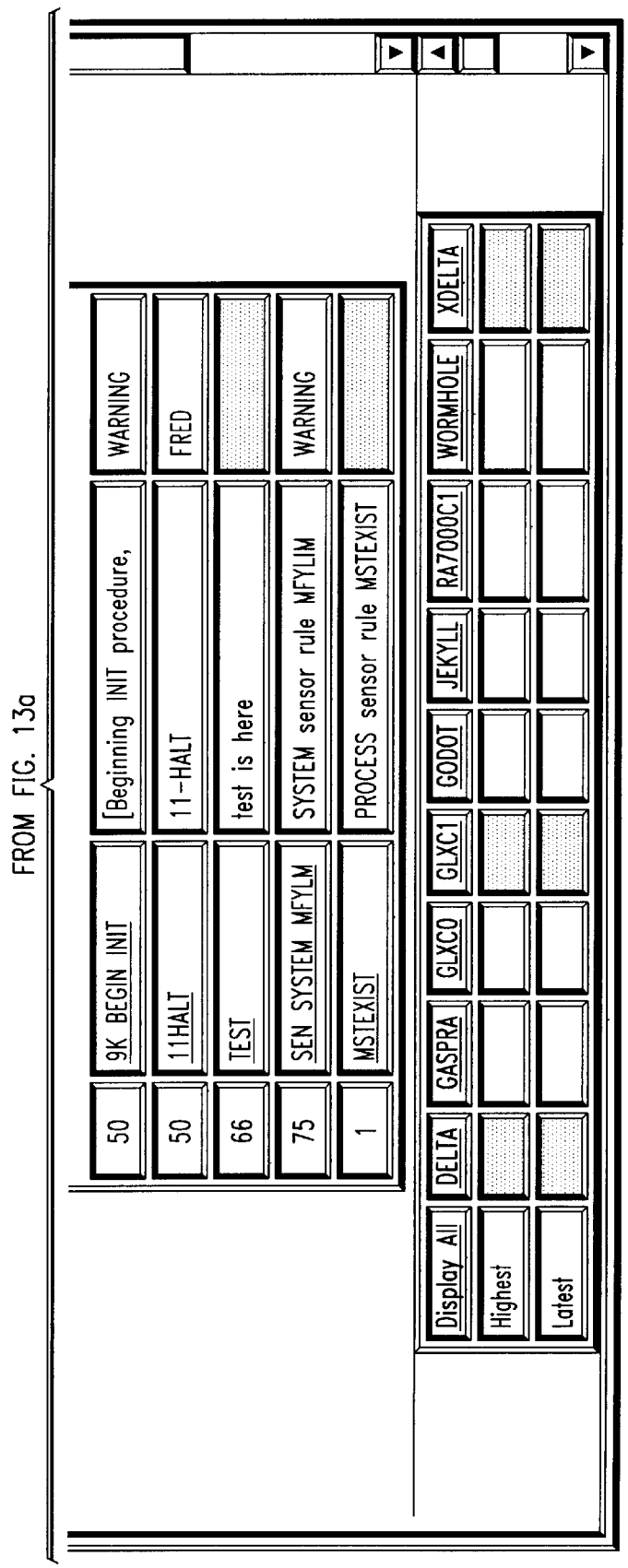

FIG. 13 shows an example screen of monitored events for the DELTA computing device.

Figure 14A:
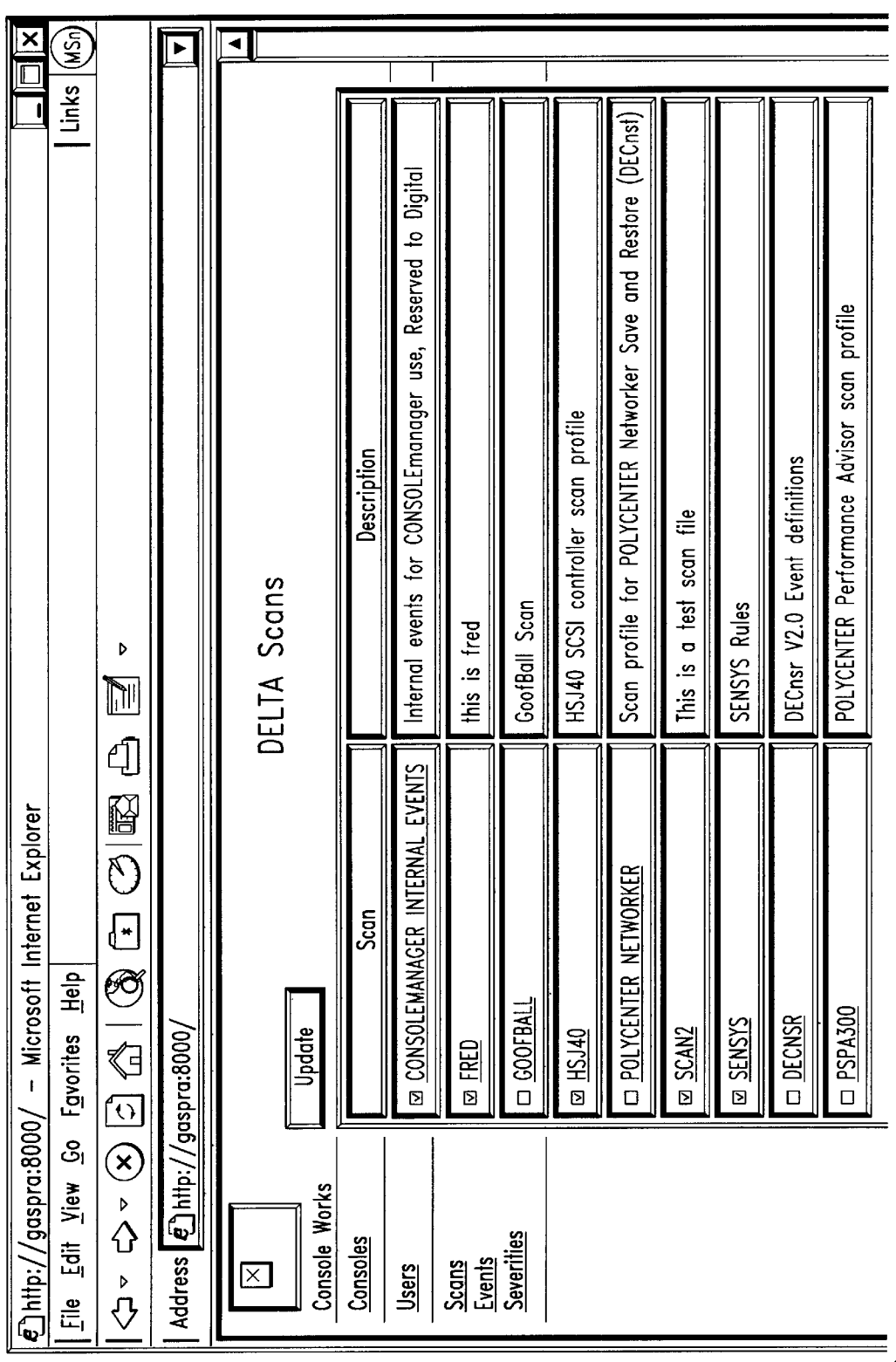
FIG. 14 shows an example screen of scans.
Figure 14B:
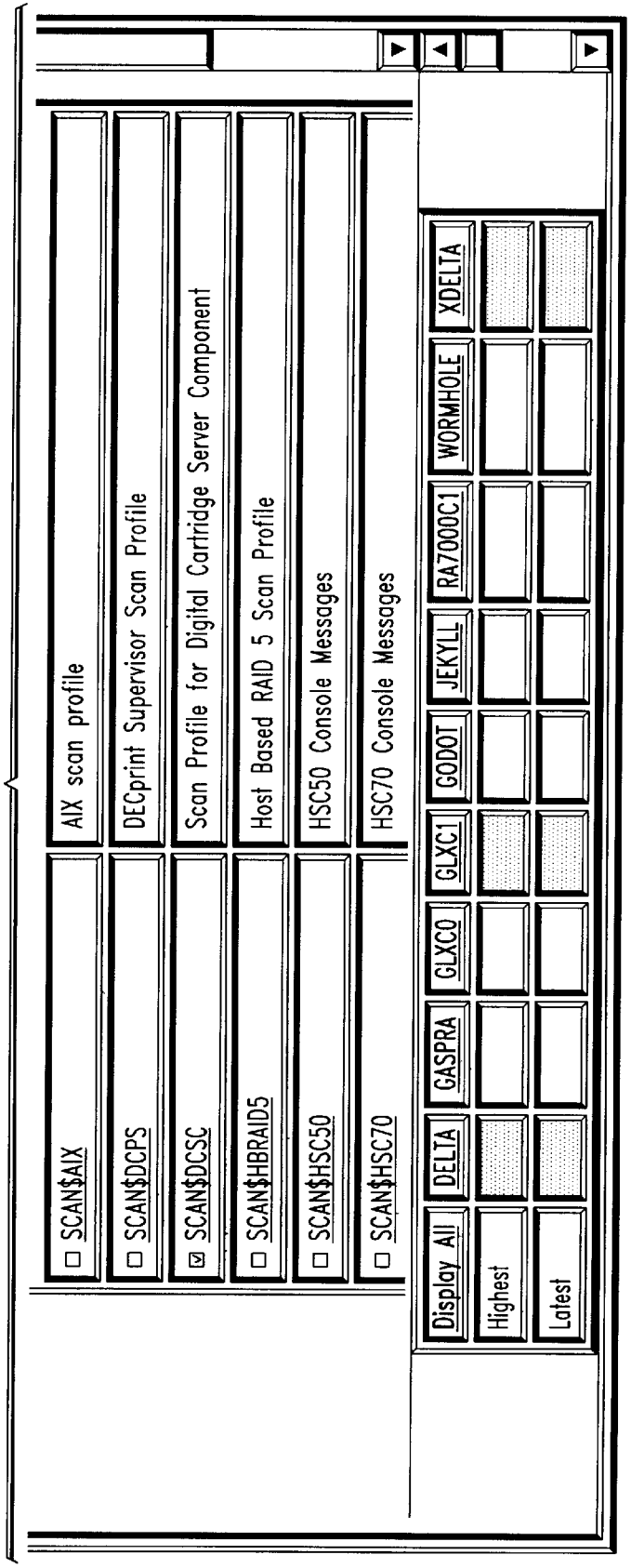

FIG. 14 shows an example screen of scans for the DELTA computing device.

Figure 15:
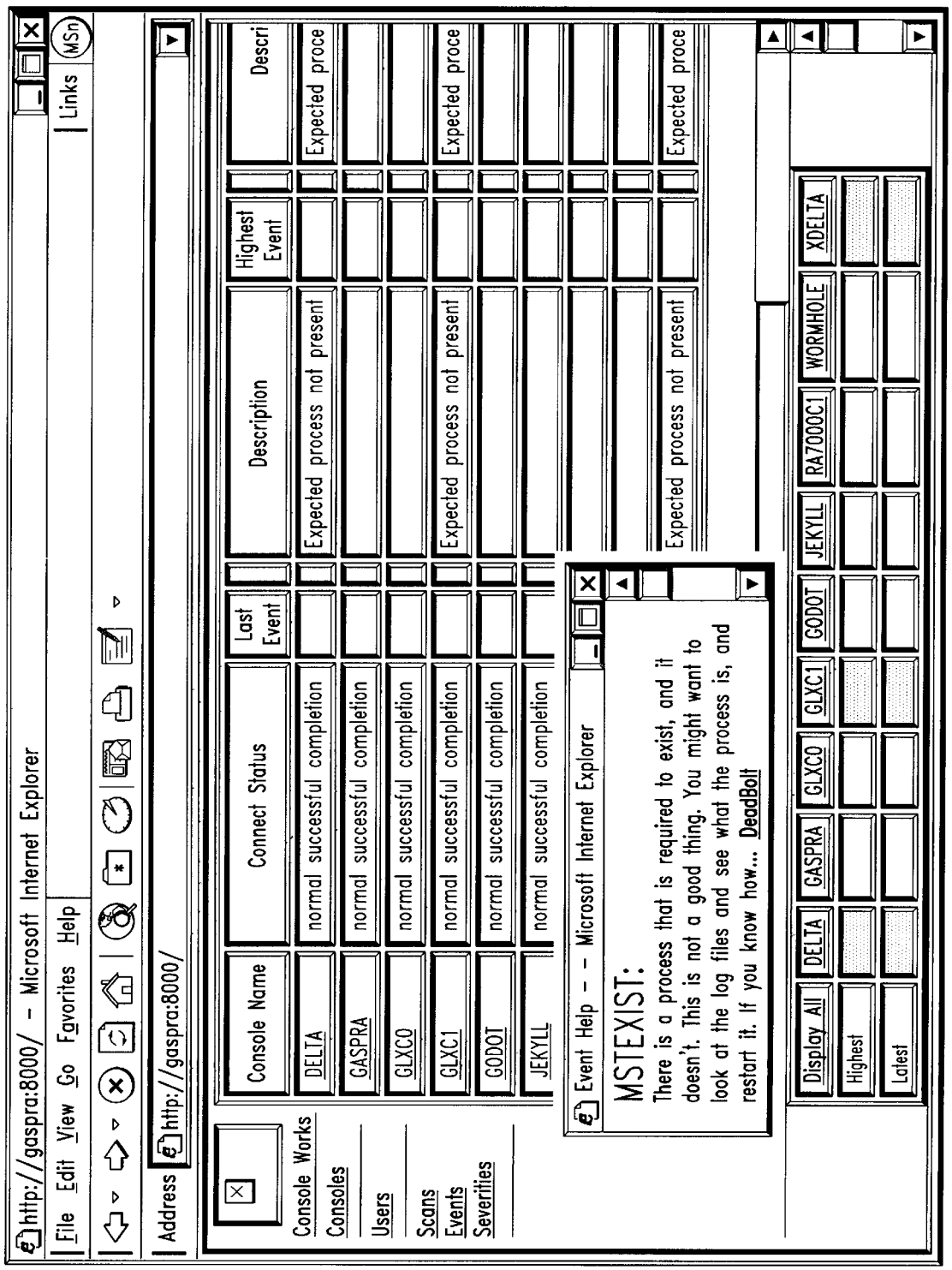
FIG. 15 shows an example screen for an error message.

FIG. 15 shows an example screen for the MSTEXIST error message.

Figure 16:
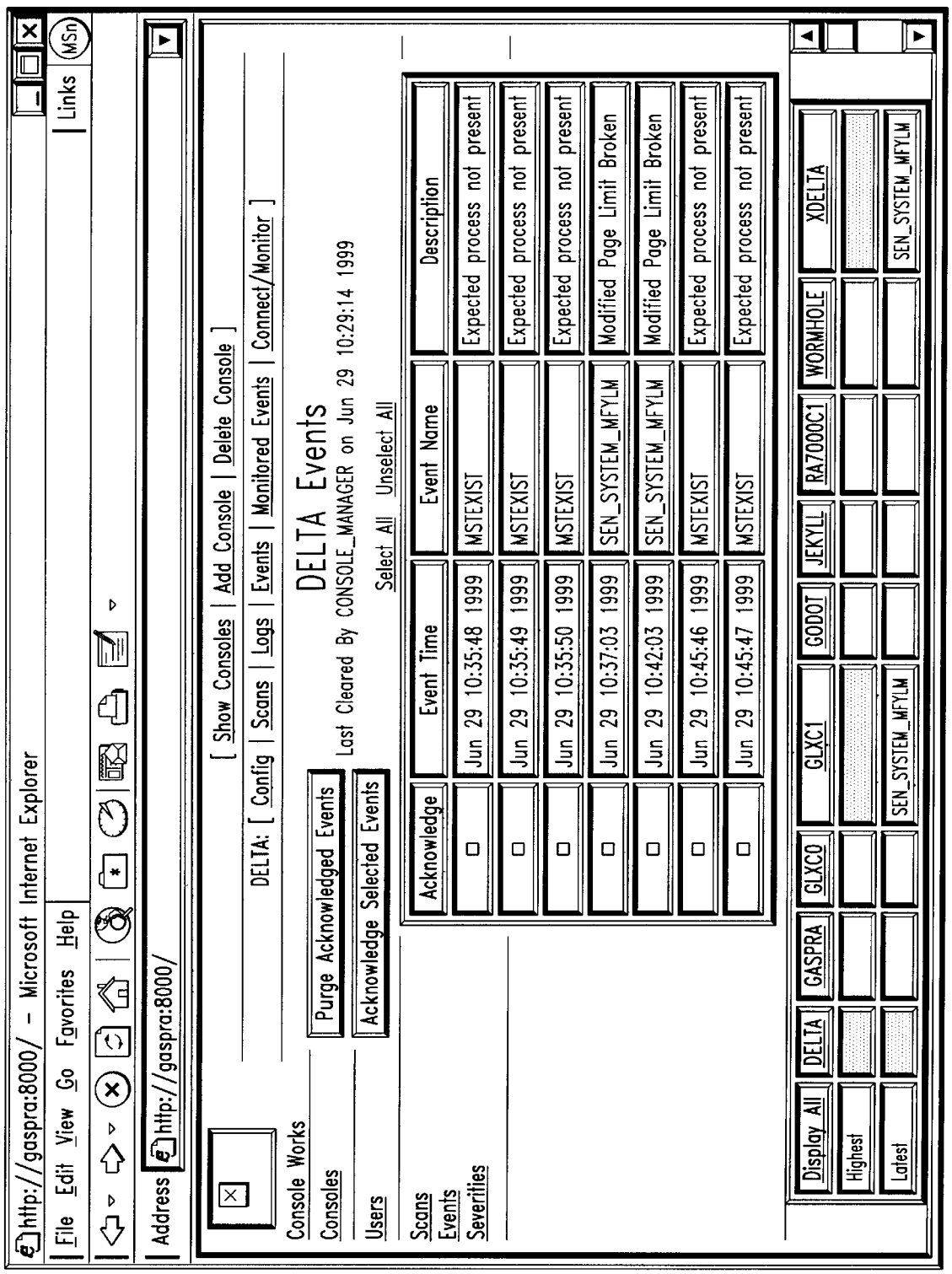
FIG. 16 shows an example screen of events that need to be acknowledged.

FIG. 16 shows an example screen for the events that need to be acknowledged for the DELTA computing device.

Figure 17:
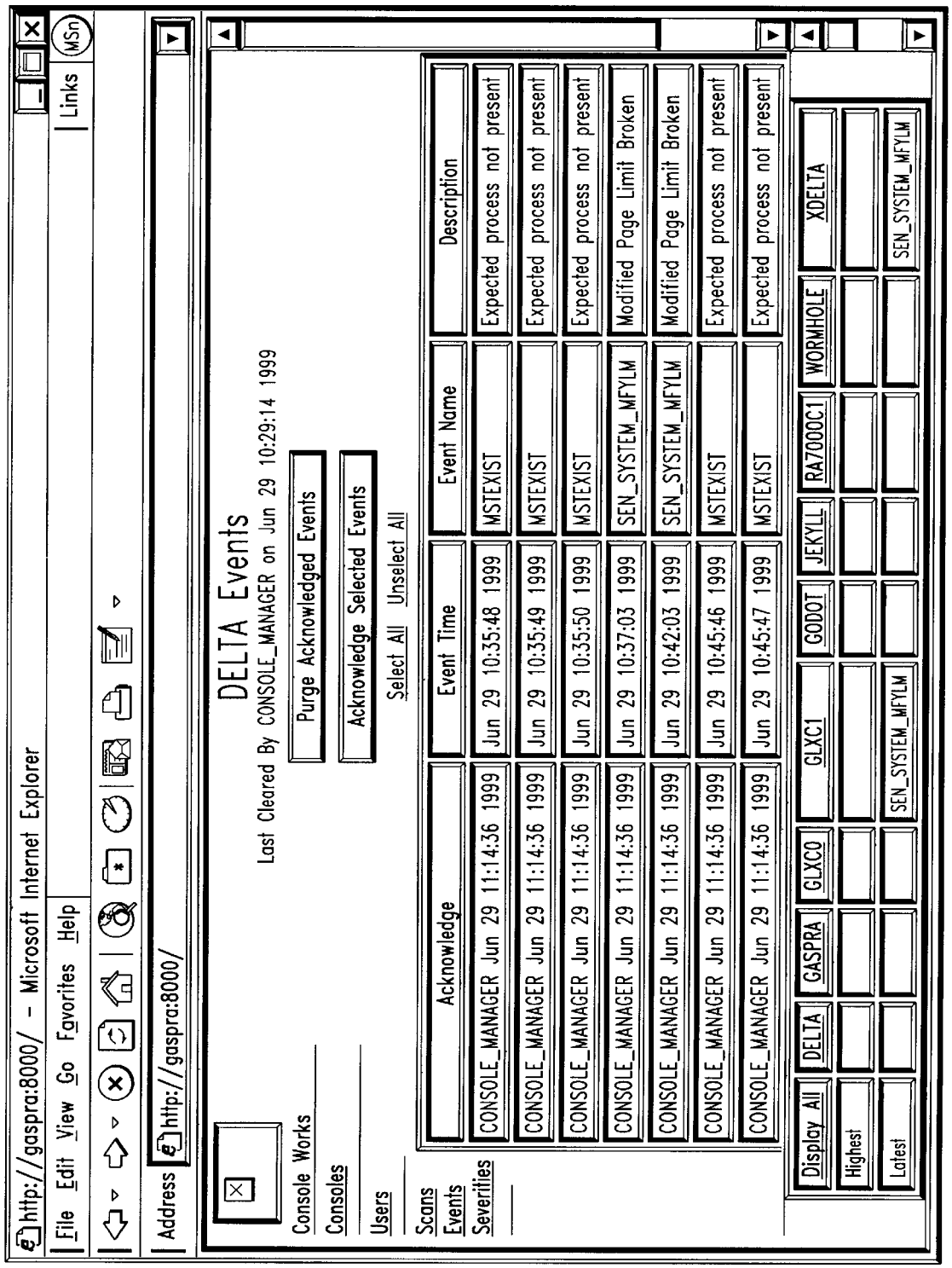
FIG. 17 shows an example screen for the history of events.

FIG. 17 shows an example screen for the history of the events that have happened for the DELTA computing device.

Figure 18:
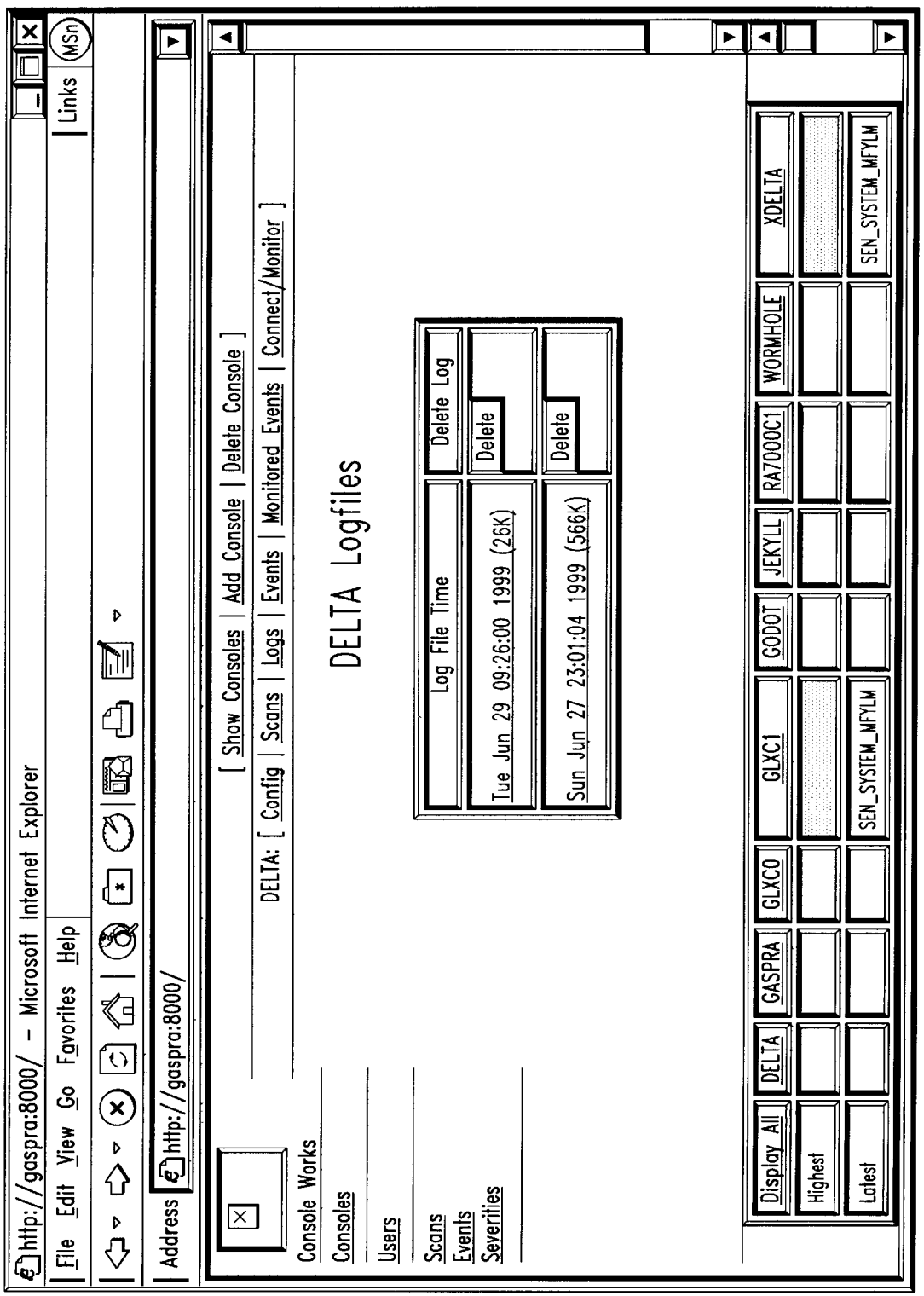
FIG. 18 shows an example screen for lo g files.

FIG. 18 shows an example screen for the log files for the events that have happened for the DELTA computing device.

Figure 19A:
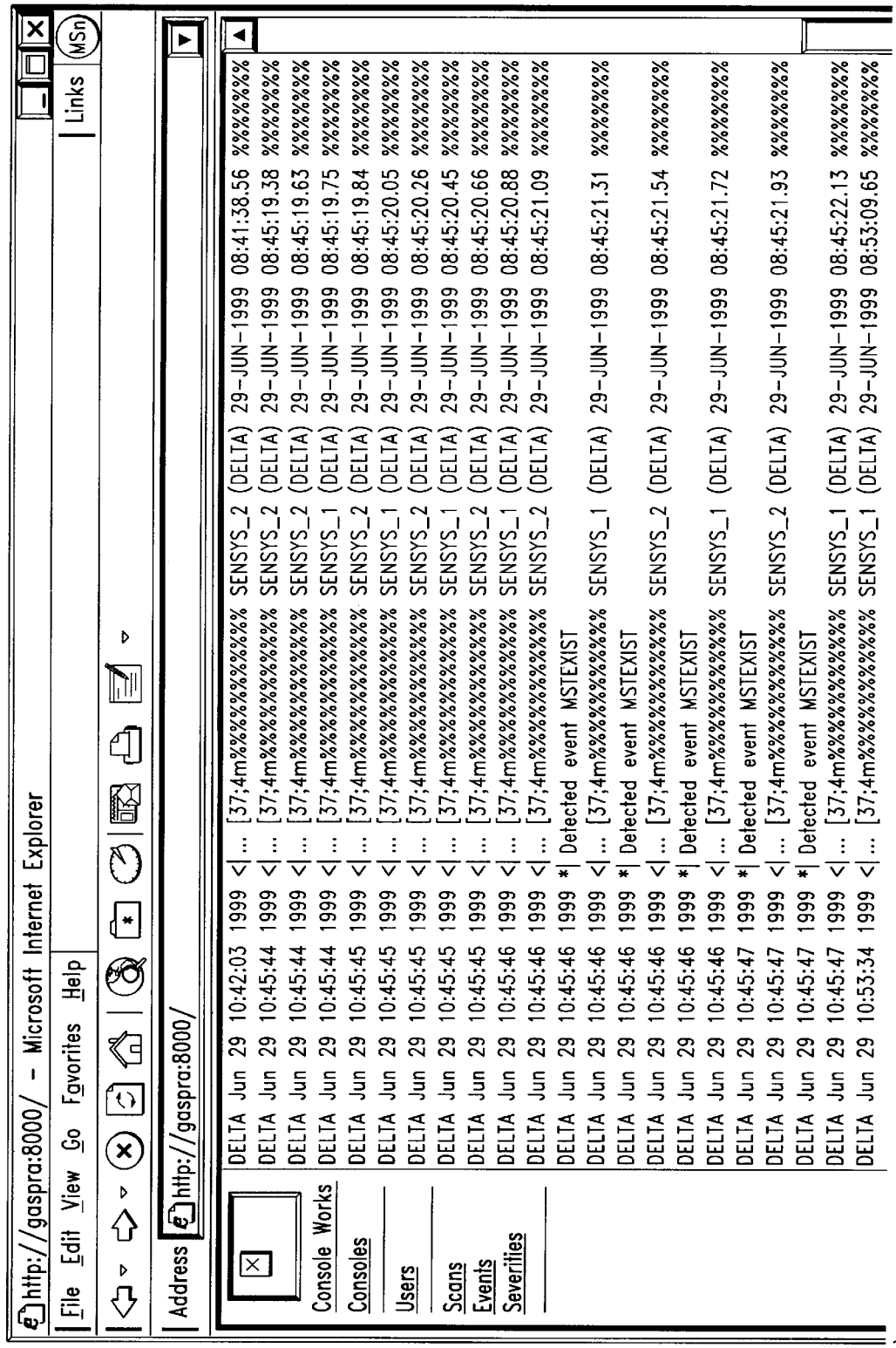
FIG. 19 shows an example screen for the entries in a log files.

FIG. 19 shows an example screen for the entries in one of the log files for the DELTA computing device.

Figure 20:
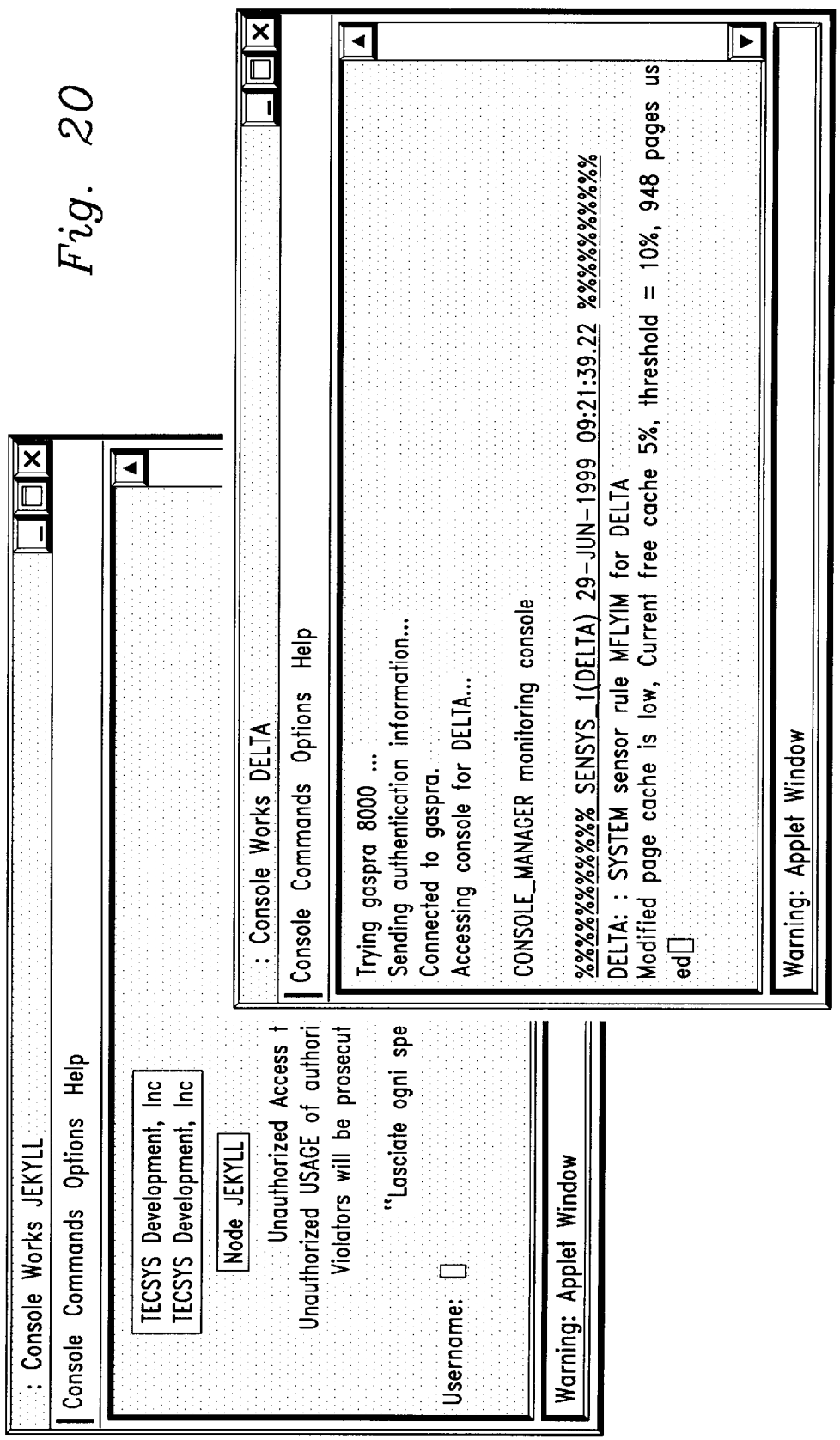
FIG. 20 shows example console screens.

FIG. 20 shows example console screens for JEKYLL and for the DELTA computing devices.

Figure 21:
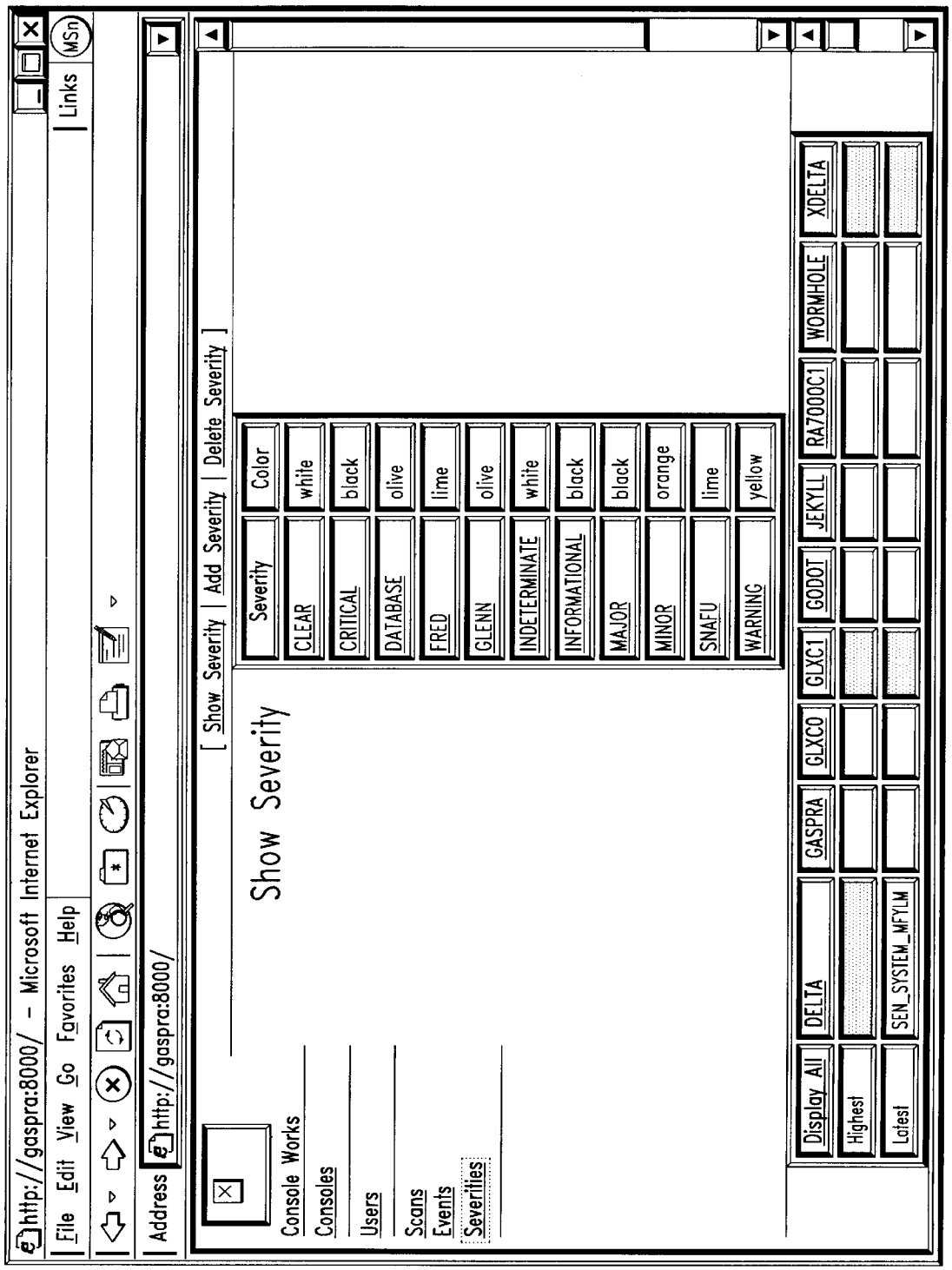
FIG. 21 shows an example screen for severity levels and colors.

FIG. 21 shows an example screen for changing the severity levels and colors for the error messages.

Figure 22:
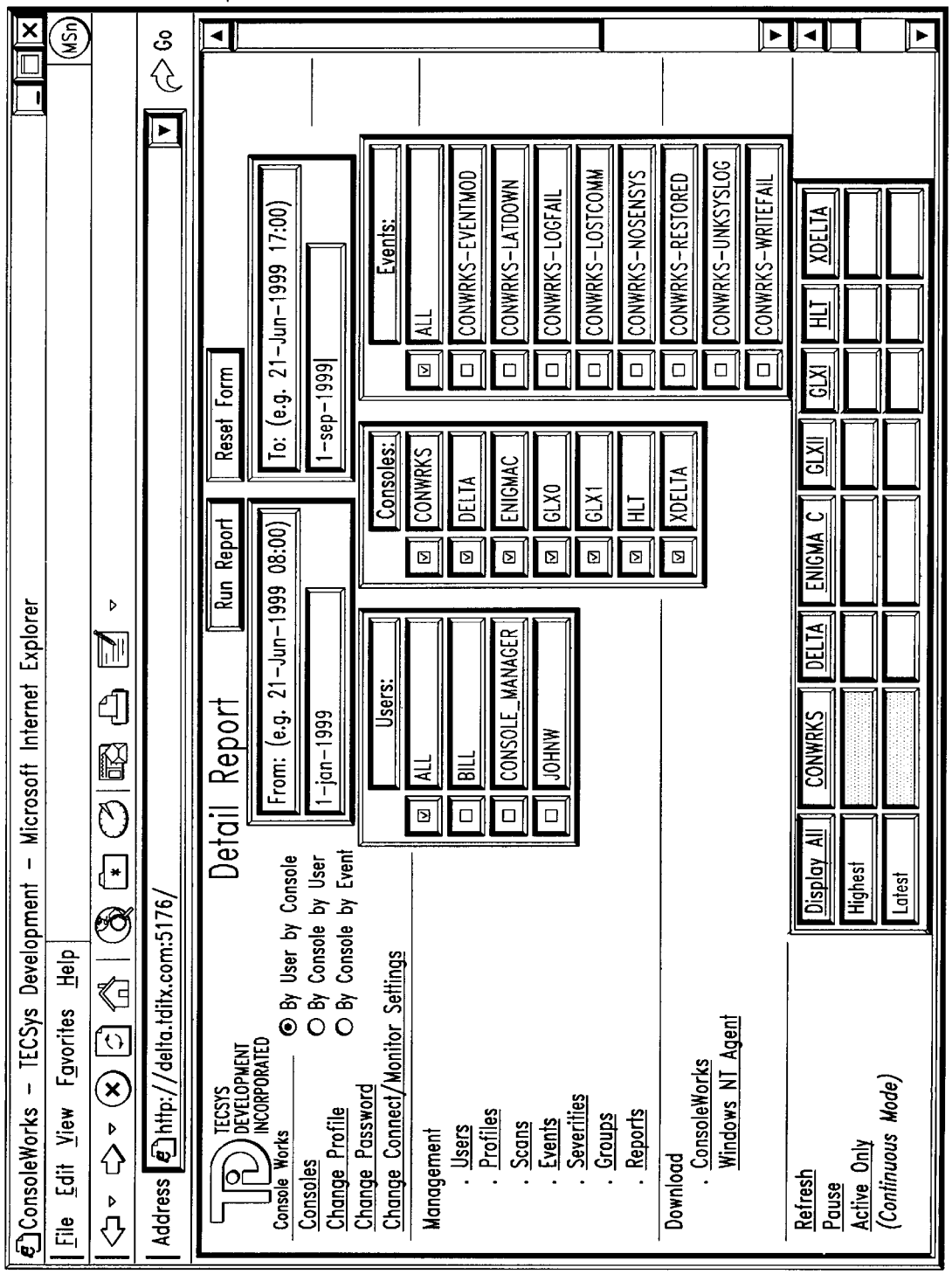
FIG. 22 shows an example screen for running a detail report.

FIG. 22 shows an example screen for running a detail report.

Figure 23:
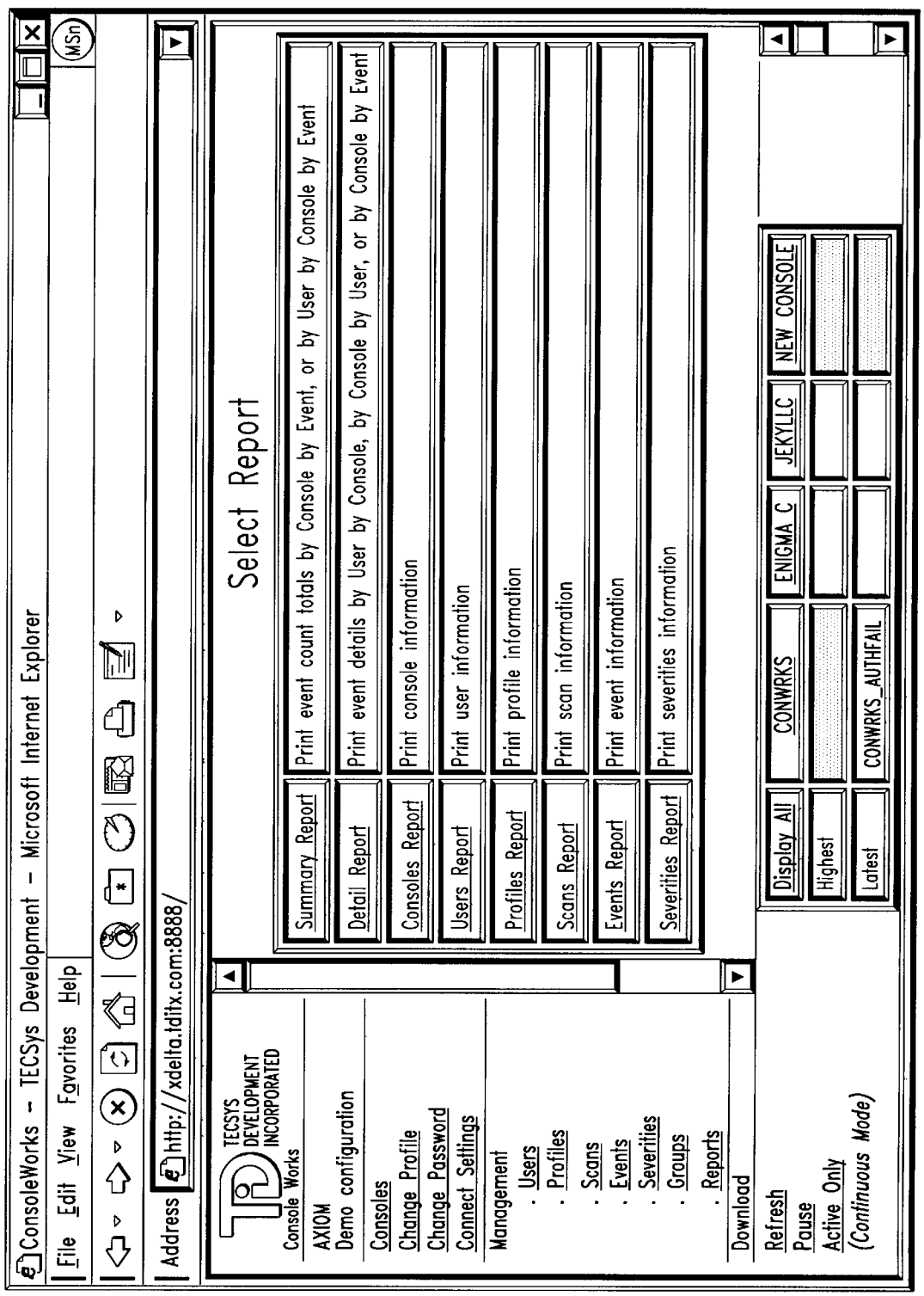
FIG. 23 shows an example screen for running a default report.

FIG. 23 shows an example screen for running a default report.

Although illustrative embodiments of the invention have been shown and described, other modifications, changes, and substitutions are intended n the foregoing disclosure. Furthermore, further details regarding one implementation of the invention is described at greater length in appendices A, B and C, all of which are attached hereto and form a part of this detailed description. Accordingly, it is appropriate that the appended claims be construed broadly and in a manner consistent with the scope of the invention.

What is claimed is:

1. A management system for computing devices connected to a computer network, the system comprising:

a plurality of disparate manageable computing devices connected to the computer network, the computing devices generating output data indicating an operational status of the computing device wherein the plurality of disparate manageable computing devices have at least two different operating systems;

a management application executing on a management console connected to receive data output directly from a console operator interface of each of the computing devices via the computer network;

a graphical user interface operating on a console connected to and remotely located from the computing devices, the user interface enabling a plurality of users to manage the computing devices;

a plurality of profiles, wherein each user has at least one associated profile; and a reporting mechanism;

wherein the computing devices are arranged in logical groups according to computing environment; and wherein for each logical group, the computing devices of the logical group are managed by a unique invocation of the management application corresponding to the logical group, such that data output from computing devices of a first one of the logical groups is transmitted to a first invocation of the management application, and wherein each invocation of the management application comprises:

an event detection module for determining from received output data whether one of a plurality of predefined events related to an operational status of a computing device has occurred at one of the computing devices of the corresponding logical group; and an action initiation module for initiating an action responsive to a determination by the event detection module that an event has occurred.

2. The system of claim 1 wherein the reporting mechanism includes means for logging all accesses to and all actions in connection with each computing device.

3. The system of claim 1 wherein the event detection module classifies the detected events by severity.

4. The system of claim 3 wherein the action comprises sending to a user a notification including the severity of the event and wherein the severity determines a property of the notification.

5. The system of claim 1 wherein each of the plurality of profiles includes a list of the computing devices the associated user can access.

6. The system of claim 1 wherein the plurality of profiles defines a system administrator that has total control over the system and all computing devices.

7. A method for managing computing devices connected to a computer network, the system comprising:

connecting a plurality of disparate manageable computing devices connected to the computer network, the computing devices generating output data directly from a console operator interface indicating an operational status of the computing device wherein the plurality of disparate manageable computing devices have at least two different operating systems;

using a management application executing on a management console connected to the computing devices for receiving data output from the computing devices via the computer network;

managing the computing devices with a graphical user interface operating on a console connected to and remotely located from the computing devices, the user interface enabling a plurality of users to manage the computing devices;

associating a plurality of profiles, with each user; and logging the events, notifications, and all accesses and actions to each computing device;

the method further comprising:

arranging the computing devices in logical groups according to computing environment; and managing the computing devices of each logical group using a unique invocation of the management application corresponding to the logical group, such that data output from computing devices of a first one of the logical groups is transmitted to a first invocation of the management application, the step of managing comprising:

determining from received output data whether one of a plurality of predefined events related to an operational status of a computing device has occurred at one of the computing devices of tie corresponding logical group; and initiating an action responsive to a determination by the event detection module that an event has occurred.

8. The method of claim 7 wherein the determining whether one of a plurality of predefined events has occurred includes classifying the events by severity.

9. The method of claim 8 wherein the initiating an action comprises sending a notification including the severity and wherein the severity determines a property of the notification.

10. The method of claim 7 wherein the associating the plurality of profiles includes listing each computing device the associated user can access.

11. The method of claim 7 wherein the associating the plurality of profiles includes creating a system administrator that has total control over the system and all computing devices.

12. A method for managing computing devices connected to a computer network, the system comprising:

monitoring each of a plurality of disparate computing devices for output indicative of an operational status of the computing device wherein the plurality of disparate manageable computing devices have at least two different operating systems;

receiving output from at least one of the plurality of computing devices, wherein the output is transmitted directly from a console operator interface of the at least one computing device;

logging and time stamping the received output if the output meets a predetermined criteria to be time stamped;

examining the output to determine whether one of a plurality of predefined events related to an operational status of the computing device has occurred; and determining whether an action is required to be executed and if so, executing the action.

13. The method of claim 12 wherein the examining the output includes classifying the output by severity.

14. The method of claim 13 wherein the action comprises sending to a user a notification including the severity of the event and wherein the severity determines a property of the notification.

15. The method of claim 12 further including associating a plurality of profiles including listing each computing device an associated user can access.

16. The method of claim 15 further including creating a system administrator that has total control over the system and all computing devices.

17. The system of claim 1 wherein the action comprises a corrective action for correcting a problem experienced by the one of the computing devices.

18. The system of claim 17 wherein the corrective action comprises issuing a command to the one of the computing devices.

19. The system of claim 4 wherein the notification is sent using a method selected from a group consisting of e-mail, telephone, and pager.

20. The method of claim 7 wherein the action comprises a corrective action for correcting a problem experienced by the one of the computing devices.

21. The method of claim 20 wherein the corrective action comprises issuing a command to the one of the computing devices.

22. The method of claim 9 wherein the notification is sent using a method selected from a group consisting of e-mail, telephone, and pager.

23. The method of claim 12 wherein the action comprises a corrective action for correcting a problem experienced by the one of the computing devices.

24. The system of claim 23 wherein the corrective action comprises issuing a command to the one of the computing devices.

25. The system of claim 12 wherein the notification is sent using a method selected from a group consisting of e-mail, telephone, and pager.

* * * * *